United States Patent
Deng et al.

(10) Patent No.: US 8,276,123 B1
(45) Date of Patent: Sep. 25, 2012

(54) ADAPTIVE REGRESSION TEST SELECTION WITHIN TESTING ENVIRONMENTS

(75) Inventors: Tao Deng, Sunnyvale, CA (US); Sachin Vasudeva, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 928 days.

(21) Appl. No.: 12/351,457

(22) Filed: Jan. 9, 2009

Related U.S. Application Data

(60) Provisional application No. 61/082,626, filed on Jul. 22, 2008.

(51) Int. Cl.
*G06F 9/44* (2006.01)
*G06F 11/00* (2006.01)

(52) U.S. Cl. ........ 717/125; 717/124; 717/126; 717/127; 714/37

(58) Field of Classification Search .................. None
See application file for complete search history.

(56) References Cited

U.S. PATENT DOCUMENTS

| | | | | |
|---|---|---|---|---|
| 5,673,387 A | * | 9/1997 | Chen et al. | 714/38.1 |
| 5,694,540 A | * | 12/1997 | Humelsine et al. | 714/38.1 |
| 5,784,588 A | * | 7/1998 | Leung | 712/216 |
| 6,859,920 B1 | * | 2/2005 | Finocchio | 717/108 |
| 2008/0126867 A1 | * | 5/2008 | Pandarinathan et al. | 714/37 |

* cited by examiner

*Primary Examiner* — Isaac Tecklu
*Assistant Examiner* — Mohammad Kabir
(74) *Attorney, Agent, or Firm* — Shumaker & Sieffert, P.A.

(57) ABSTRACT

In general, techniques are described for intelligently selecting test cases within testing environments. Specifically, a computing device may include a user interface with which a user interacts to specify a safety level. The device also includes a control unit that determines those functions of source code that changed. Based on these changed functions, the control unit determines those functions of the source code not changed but impacted by the changes within a set distance. The control unit then selects, for each of these determined functions, one or more test cases in accordance with one or more test selection algorithms by adaptively applying these algorithms in order of decreasing safety assurances and increasing precision. The control unit further aggregates these selected test cases and implement the test cases to ensure the safety level with respect to a percentage of functional errors occurring within a software program compiled from the source code.

33 Claims, 11 Drawing Sheets though rarely, reveal a functional error or fault. 100 percent precision may require that the server select only those test cases that reveal a fault or functional error in the new version of the software.

ADAPTIVE REGRESSION TEST SELECTION WITHIN TESTING ENVIRONMENTS

This application claims the benefit of U.S. provisional Application No. 61/082,626, which was filed on Jul. 22, 2008.

TECHNICAL FIELD

The invention relates to computing devices and, particularly, to test selection by computing devices.

BACKGROUND

Computing devices typically include a central processing device (CPU) or other control unit that executes instructions. The instruction may be packaged together to form a computer program or executable. These computer programs or executables are generally referred to as software. The computing devices may include memory or other storage media that store the computer programs and, in response to a user's command, the control unit may load or otherwise execute one or more of the computer programs indicated by the user command. In this respect, computing devices may represent a platform on which a wide variety of software may execute. Example computing devices include general purpose computers (e.g., desktop computers, laptops, and network servers) as well as other devices that contain embedded CPUs or other control units (e.g., routers, printers, switches, firewalls, monitors, disk drives, telephones, television, automobiles or any such computer-controlled device).

To develop software, a team of one or more computer programmers typically writes code in a high-level programming language, such as C, C++, Java, or Visual Basic. The code may comprise a number of functions called by a main executable. This development team, upon completing particular portions, e.g., functions, of the software may compile these portions into machine code or other low-level instructions that are executable by the control unit. This low-level code that is executable by the control unit may represent the above mentioned software or executables.

After compiling the high-level code to generate the software, the development team may proceed to verify the functionality of the software when executed by the target device. Typically, the development team maintains a test environment in which to test this software when deployed on the target device. For example, when the target computing device is a network device to be deployed within a packet-based network, the test environment may include one or more computing devices that can be configured to simulate one or more "test beds." These test beds may each represent a particular test scenario with respect to emulated network configurations. The development team may design test cases that utilize these test beds to test a particular functionality or behavior of the software when executed by the target network device with respect to the requirements of the particular network configuration One test case, for example, may test functionality of the software related to establishing a communication session and communicating data by way of the communication session. The development team may manually implement this test case by configuring the computing devices of the test environment such that a first one of the computing devices establishes a communication session with a second one of the computing devices that executes the software to be tested (i.e., the target computing device). The development team may then cause the first computing device to transmit data via the communication session to the second computing device and observe the functionality and behavior of the second computing device as it executes the software to respond to these communications. The development team may report any functional errors observed during this testing and debug the high-level code to resolve the errors. The development team may, after debugging the high-level code, recompile the high-level code into the low-level code, and re-implement the test case to determine whether the functional error has been corrected. The development team may repeat this process until all functional errors have been debugged and, after debugging all of the errors, release the software to the public.

For large-scale software development or software having a large code base, the development team may automate this testing to increase the efficiency with which testing may be accomplished. To automate the testing, the development team commonly implements each test case as a script or other programmable module that the test environment may execute to automatically configure each test bed and programmatically cause the computing devices of the configured test bed to interact with one another in a desired way. These automated test cases may further evaluate the interactions between the computing devices in order to assess a particular functionality or behavior of the software. The automated tests may also report the outcome of the test identifying inappropriate behavior, e.g., functional errors, or other deficiencies of the software. As the automation may not require human intervention, the automation of the test cases may increase testing efficiency.

To ensure each subsequent release of the software is free of software bugs, e.g., functional errors, another team of one or more computer programmers or quality assurance specialists may perform regression testing against the software to be released. This regression testing team may collect each of the automated tests generated prior to each successive release of the software and maintain every one of these automated test cases in a regression test case database. Prior to releasing each version of the software, the regression testing team may run each and every one of the automated tests collected for previous versions of the software to test the new or next version of the software prior to releasing this new version of the software for public use. This form of full regression testing may ensure consistent behavior of the software by verifying that changes made to previous versions of the software in order to generate the new version have not reintroduced functional errors that impacted functionality previously incorporated within older versions of the software.

SUMMARY

In general, techniques are described for intelligent regression test selection within software test environments. A computing device, such as a network server, may implement the intelligent Regression Test Selection (RTS) techniques to balance safety against precision in order to facilitate the efficiency with which regression testing is performed. "Safety" may refer to a measurement of the capability of the server to select automated test cases that, when implemented, reveal a functional error or fault in a final set of tests cases. To be 100 percent safe requires the server to select a set of test cases that reveal all functional errors in the new version of the software. Typically, the easiest way to achieve 100 percent safety is for the server to select all of the test cases of a given regression test suite for implementation.

"Precision" may refer to a measurement of the capability of the server to eliminate those automated test cases that, when implemented, do not reveal a functional error or fault, or only reveal a redundant functional error or fault, from the final set of test cases. A higher precision is achieved when a smaller number of test cases are selected. If the server selects all test cases in the given regression test suite, it results in the worst precision. The best precision achievable without compromising safety requires the server to select test cases, each of which reveals at least one unique functional error, while all those test cases not selected, when implemented, fail to reveal any error other than those revealed by the selected test cases. To be 100 percent precise typically requires the server to select no test case, which is not a practical scenario.

The techniques may balance these two competing interests by enabling the server to prompt a user for, or otherwise determine, a given level of safety. Based on this level of safety, the server may select a subset of test cases from the full regression test suite that provide the given level of safety without requiring execution of each test case of the full regression test suite. In terms of the above metrics, safety and precision, the server may implement the techniques to achieve a given level of safety with reasonably high precision. Precision may be considered "reasonable" insomuch as the cost of selecting each test case does not overshadow or exceed costs associated with actually executing each test case. By enabling this dynamic selection of safety, the techniques may enable flexible regression testing that bends to meet different safety/precision requirements of various regression testing scenarios.

In operation, the server or other computing device that implements the techniques may prompt a user for a given level of safety. The user may input the level of safety as a percentage, e.g., 90%, or may enter a handle or other keyword representative of a level of safety, such as "high" safety that may correspond to the 90 percent safety level. When using this representative level of safety, the server may associate the handle or keyword with any particular level of safety to suit a development team's needs. The server may maintain these associations as data. This data may represent one or more "safety profiles," each of which associates the handle with the desired level of safety.

In response to a given level of safety, the server may determine a value of one or more variables that act as constraints on a test selection algorithm implemented by the server to select a subset of test cases from the full regression suite. Typically, each profile defines these values or, in instances where the user enters the given level of service, the server may maintain data associating these values with the given level of service. For example, the server, in accordance with the techniques, may implement a test selection algorithm referred to herein as an "adaptive-combo" test selection algorithm. This algorithm may adaptively apply one or more, e.g., a combination or combo of, test selection algorithms to select the subset of test cases, including a "FULL-SET" algorithm, a range of "COMBO-SET(x)" algorithms, and a "MIN-SET" algorithm. For the COMBO-SET(x) test selection algorithm, an "x" variable may act as a limit on the total number of test cases the COMBO-SET(x) algorithm may select for a unique block combinations of a given function of source code. The profile may define the maximum value for this "x" variable, which may be referred to as $X_{max}$. The adaptive-combo algorithm may also take as inputs two other variables referred to as $D_{max}$ and $N_{max}$, which again may be defined by each of the profiles.

The server, upon retrieving these values, may then implement the adaptive-combo test selection algorithm to select the subset of test cases using these values as inputs into the adaptive-combo algorithm. In accordance with this adaptive-combo algorithm, the server may first determine those functions whose lines of code have changed between versions of the source code. The server may identify these changed functions from changed code data. Based on these changed functions, the server may then determine those functions whose lines of code have not changed but been impacted by the changes to the changed functions. The server may identify these impacted functions based on dependency data that defines a graph having nodes that represent each of the functions of the source code. The server may traverse the graph to locate the nodes representing the changed function and select those nodes surrounding the nodes representative of the changed functions within a given radius. The server may determine this radius based on the $D_{max}$ value determined from the above described selected profile, where the $D_{max}$ represents the maximum distance from a node identified as representing the changed function. In this respect, the server, by limiting the selection of impacted functions to a given distance or radius, may increase the test selection precision. Moreover, by incorporating a user interface featuring a configurable knob or other input means for setting and adjusting a $D_{max}$ variable, the techniques may provide the above described flexibility.

The server may next aggregate the changed and impacted functions into a list and select the subset of test cases based on this changed and impacted functions list. Particular, the server, in accordance with the adaptive-combo algorithm, may retrieve a function from this list and select test cases for this first function by implementing a first test selection algorithm referred to as "FULL-SET." This FULL-SET algorithm provides maximum safety as it selects every test case from the full regression test suite that exercises the first function.

To make this selection, the server may access coverage data that captures how each test case of the full regression suite exercises every code block within every function. This data associates every test case with one or more code blocks of a particular one of the functions of the source code. Each of the code blocks may comprise a contiguous block of the source code having a single point of entry and a single point of exit. The server may then select test cases based on the corresponding block to test case associations. For the FULL-SET algorithm, the server selects all test cases that exercise any block(s) of the current function.

The server may then compare the number of test cases selected for this function using the FULL-SET algorithm to value for variable $N_{max}$, which defines the maximum number of test cases that the server can select for each function. In this respect, the $N_{max}$ variable may represent a configurable knob or variable by which the techniques may preserve precision. If the value of the $N_{max}$ variable is less than the number of test cases selected for the current function using the FULL-SET algorithm, meaning the number of selected test cases of the FULL-SET algorithm is so large that it has exceeded the precision requirements configured by $N_{max}$, the server, in accordance with the adaptive-combo algorithm, implements the COMBO-SET(x) algorithm, with x initially set to the value of $X_{max}$. The server then attempts to select test cases that "cover" or exercise the current function in accordance with the COMBO-SET(x) algorithm. Compared to the FULL-SET algorithm, the COMBO-SET(x) algorithm, instead of selecting all test cases that exercises the test function, may be more precise, as it only selects test cases that exercises the test function in a unique way, while parameter 'x' controls the level of test selection redundancy allowed for each unique "way" (block coverage).

For COMBO-SET(x) algorithm, every unique block combination for the test function must select 'x' test cases if available. Here, 'x' sets an upper limit on the number of test cases that the server may select for each unique block combination on the test function. For example, if a total of 'n,' with n greater than zero (n>0), test cases all exercise the same block combination for the function, the COMBO-SET(x) algorithm, when implemented by the server, selects all 'n' test cases when 'x' is greater than or equal to 'n' (x>=n). It selects 'x' out of 'n' test cases when 'x' is less than 'n' (x<n), based on, for example, time-to-execute data stored in the coverage data for the corresponding test cases. Therefore, a larger 'x' yields more redundancy in the COMBO-SET(x) n algorithm. If 'x' is large enough, COMBO-SET(x) may trend test selection toward test selection performed by the FULL-SET algorithm. The same procedure is applied to all unique block combinations on the test function stored in the coverage data. By utilizing a metric like average test execution time in test selection, the techniques may not only ensure precision by way of the $N_{max}$ variable but also ensure that this precision is achieved with reasonable efficiency.

If, again, the number of test cases selected using COMBO-SET(x) (x initialized to $X_{max}$) exceeds $N_{max}$, the server decrements the x value by one, and re-implements the COMBO-SET(x) algorithm with this decremented 'x' value. The server continues in this manner until the x value is less than one, meaning the most precise (least safe) candidate in the COMBO-SET(x) algorithm suite is still not precise enough, or the number of test cases selected for the function is less than $N_{max}$, meaning this COMBO-SET(x) has returned a set of test cases satisfying the precision requirement defined by $N_{max}$. Upon determining that the 'x' value is less than one, the server may implement a third algorithm referred to as "MIN-SET," which selects test cases so that every block of the current function is covered by at least one test case. The "MIN-SET" algorithm therefore may represent the most precise algorithm of the three.

If at any point the number of test cases selected for the current function is less than or equal to $N_{max}$, the server notes the selected test cases and retrieves the next function on the changed and impacted functions list. After selecting test cases in this manner for each of the functions on the list, the server aggregates the selected test cases into a final test set and executes these test cases as a regression test of the software compiled form the source code. The final test set may represent a set of test cases that achieves the desired level of safety selected by the user.

Often, the user, to configure the above variables $N_{max}$, $X_{max}$, and $D_{max}$, so that the adaptive-combo algorithm achieves this desired level of safety, may perform empirical tests and observe the results with the variables set to various values. Upon observing the desired level of safety, the user may define the profiles to specify the values that achieved this safety level and associate handles to the profiles to quickly configure the adaptive-combo algorithm to achieve this safety level for successive test. For example, the user may define profiles that associate handles "major release," "minor release," "service release," and "internal release" with desired safety levels of 100%, 90%, 80% and 70%, respectively. A user may then select, for each phase in the development of the software, one of the handles to quickly tailor regression testing to suit that cycles desired safety levels.

In one embodiment, a method comprises determining, with a computing device, those functions of source code whose lines of code have changed between different versions of the software program, determining, with the computing device, those of the functions of the source code whose lines of code have not changed but have been impacted by the changes based on dependency data and the determined changed functions, wherein the dependency data defines dependencies between the functions of the source code, and selecting, with the computing device, one or more test cases from a full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a set of test cases satisfying the precision requirement per changed/impacted function. The method further comprises aggregating, with the computing device, the one or more test cases selected for each one of the changed and impacted functions to generate a final test set that includes a subset of test cases from the full set of test cases, and executing, with the computing device, the final test set to ensure a given level of safety with respect to a percentage of functional errors that reside within a software program compiled from the source code.

In another embodiment, a method comprises determining, with a computing device, those functions of source code whose lines of code have changed between different versions of the software program, determining, with the computing device, those of the functions of the source code whose lines of code have not changed but have been impacted by the changes based on dependency data and the determined changed functions, wherein the dependency data defines dependencies between the functions of the source code and selecting, with the computing device, a subset of a full set of test cases that uniquely exercises every one of the changed and impacted functions based on coverage data, wherein the coverage data defines at least one function-level block combination for each test case of the full set of test cases, wherein each of the function-level block combinations comprises data that associates a different one of the test cases with one or more blocks of a particular one of the functions of the source code, wherein each of the blocks comprises a contiguous block of the source code having a single point of entry and a single point of exit. The method also comprises executing, with the computing device, the subset of the full set of test cases to ensure a given level of safety with respect to a percentage of functional errors that reside within a software program compiled from the source code.

In another embodiment, a testing server comprises a control unit that includes an intelligent test selection module that determines those functions of source code whose lines of code have changed between different versions of the software program, determines those of the functions of the source code whose lines of code have not changed but have been impacted by the changes based on dependency data and the determined changed functions, wherein the dependency data defines dependencies between the functions of the source code, selects one or more test cases from a full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a set of test cases satisfying the precision requirement per changed/impacted function and aggregates the one or more test cases selected for each one of the changed and impacted functions to generate a final test set that includes a subset of test cases from the full set of test cases. The control unit also includes a regression harness that executes the final test set to ensure a given level of safety with respect to a percentage of functional errors that reside within a software program compiled from the source code.

In another embodiment, a testing system comprises a test bench comprising a plurality of network devices, a test selection database that stores dependency data and code change data, a test case database that stores a full set of test cases and a testing server communicatively coupled to the test bench, the test selection database and the test case database. The testing server includes a control unit that comprises an intelligent test selection module that determines those functions of source code whose lines of code have changed between different versions of the software program based on the code change data, determines those of the functions of the source code whose lines of code have not changed but have been impacted by the changes based on the dependency data and the determined changed functions, wherein the dependency data defines dependencies between the functions of the source code, selects one or more test cases from the full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a set of test cases satisfying the precision requirement per changed/impacted function and aggregates the one or more test cases selected for each one of the changed and impacted functions to generate a final test set that includes a subset of test cases from the full set of test cases. The control unit also includes a regression harness that executes the final test set within the plurality of network devices of the test bench to ensure a given level of safety with respect to a percentage of functional errors that reside within a software program compiled from the source code.

A computer-readable medium comprising instructions for causing a programmable processor to determine, with a computing device, those functions of source code whose lines of code have changed between different versions of the software program, determine, with the computing device, those of the functions of the source code whose lines of code have not changed but have been impacted by the changes based on dependency data and the determined changed functions, wherein the dependency data defines dependencies between the functions of the source code, select, with the computing device, one or more test cases from a full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a set of test cases satisfying the precision requirement per changed/impacted function, aggregate, with the computing device, the one or more test cases selected for each one of the changed and impacted functions to generate a final test set that includes a subset of test cases from the full set of test cases, and execute, with the computing device, the final test set to ensure a given level of safety with respect to a percentage of functional errors that reside within a software program compiled from the source code.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
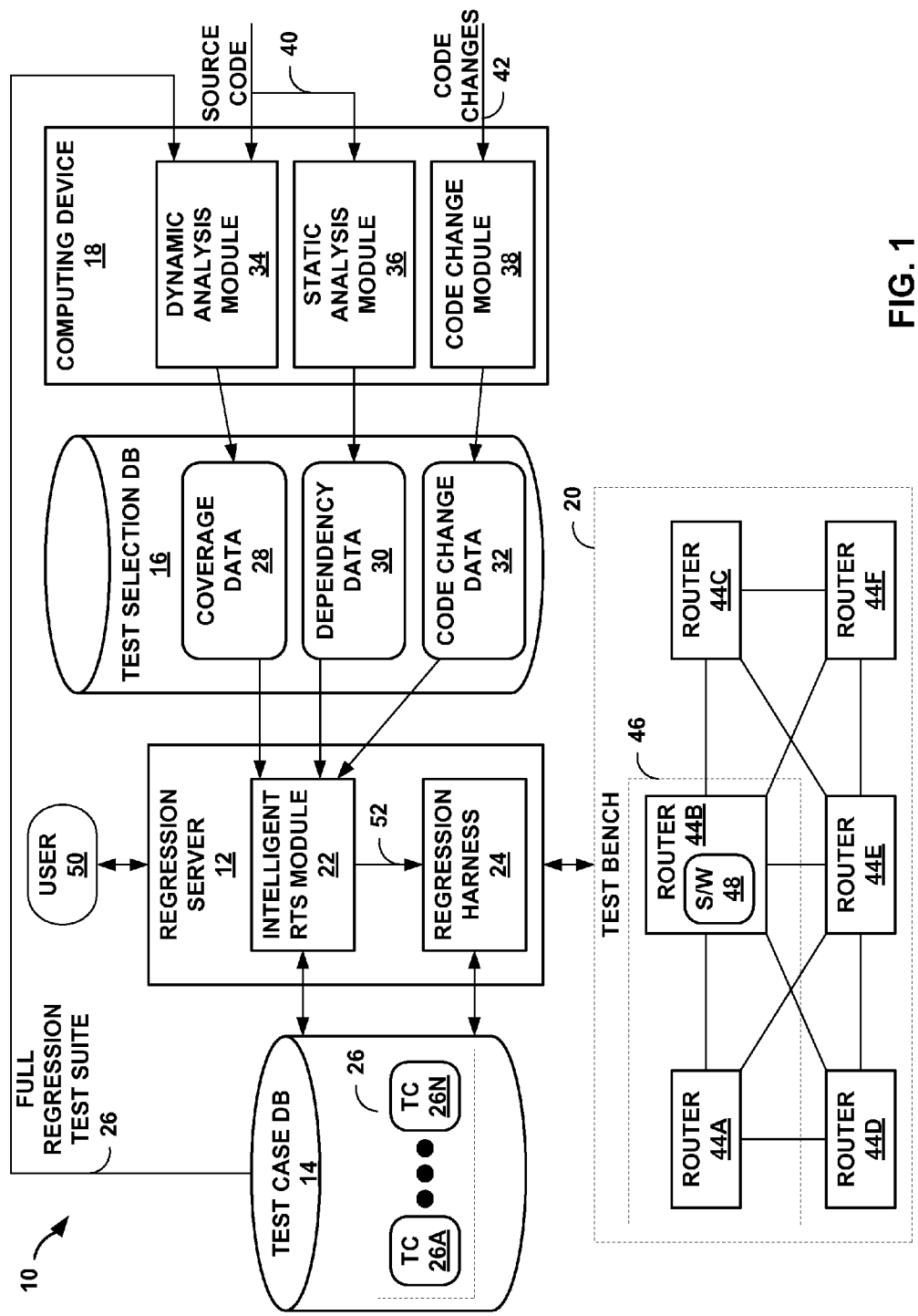
FIG. 1 is a block diagram illustrating an exemplary test environment in which a regression server implements the intelligent regression test selection techniques to improve the efficiency of regression testing.

FIG. 1 is a block diagram illustrating an exemplary test environment 10 in which a regression server 12 implements the intelligent regression test selection techniques to improve the efficiency of regression testing. While described herein with respect to a particular computing device, i.e., regression server 12, the intelligent Regression Test Selection (RTS) techniques may be implemented by any computing device capable of selecting test cases for use in regression testing.

As shown in FIG. 1, test environment 10 includes regression server 12, a test case database 14 ("test case DB 14"), a test selection database 16 ("test selection DB 16"), a computing device 18 and a test bench 20. Regression server 12 may represent any computing device a capable of selecting test cases for use in regression testing. Regression server 12 includes an intelligent RTS module 22 that represents a software and/or hardware module that implements the intelligent RTS techniques described in more detail below. Regression server 12 may also include a regression harness 24 representative of a software and/or hardware module that implements selected test cases within test bench 20.

Test selection database 14 may comprise any computer-readable medium, including a storage device (e.g., a disk drive, or an optical drive) and/or memory (such as Flash memory, random access memory or RAM), that stores test cases 26A-26N ("TCs 26A-26N"). Collectively, test cases 26A-26N ("test cases 26" or "TCs 26") may also be referred to as the above mention "full regression test suite." In this respect, test cases 26 may be identified collectively as full regression test suite 26. Each of test cases 26 may represent a script or other document capable of being parsed that defines a series of instructions. Each of test cases 26 may be parsed to extract the series of instructions, which may be used to configure a test bed within test bench 20. The series of instruction may also be used to cause test bench 20 to test a particular functionality of a given software program, observe and report the results of the test, and clean up or otherwise tear down the test bed. While described as a script, each of test cases 26 may comprise any other form by which instructions are packaged, such as a software program, that cause a programmable processor or any other type of control unit to perform these operations.

Test selection database 16 may comprise any computer-readable medium, including a storage device (e.g., a disk drive, or an optical drive) and/or memory (such as Flash memory, random access memory or RAM), that stores information or data pertinent to intelligently selecting a subset of test cases 26 in accordance with the techniques described herein. Test selection database 16 may, as an example, store this data as coverage data 28, dependency data 30 and code change data 32. While shown as two separate databases 14 and 16, the techniques may be implemented with a single database such that this single database combines into one database both test case database 14 and test selection database 16. Likewise, the techniques may be implemented in a manner whereby three or more databases store test cases 26, coverage data 28, dependency data 30 and code change data 32. For example, one database may store test cases 26, another database may store coverage data 28, yet another database may store dependency data 30 and a fourth database may store code change data 32. The techniques therefore should not be limited to the exemplary embodiment shown in FIG. 1.

Computing device 18 may comprise server, a desktop computer, a workstation, a laptop computer, a cellular phone, a so-called "smart" phone, a Personal Digital Assistant (PDA), or any other device capable of executing one or more modules to generate coverage data 28, dependency data 30 and code change data 32. For example, computing device 18 may execute a dynamic analysis module 34 to generate coverage data 28, a static analysis module 36 to generate dependency data 30 and a code change module 38 to generate code change data 32. Each of these modules 34-38 may then store respective data 28-32 to test selection database 16. While described respectively as software modules executed by computing device 18 generally and a processor or control unit of computing device 18 in particular, each of modules 34-38 may comprise a hardware and/or software module capable of performing the below described operations.

Dynamic analysis module 34 may, for example, represent a hardware and/or software module that determines coverage data 28 by determining the extent to which each of test cases 26 test or "cover" a particular block of source code 40. Source code 40 may comprise a series of human-readable statements typically written in a high-level programming language, such as C, C++, Java, or Visual Basic. These statements may be organized into one or more functions, which represent discreet functional portions of the code that can be invoked or "called" by another function. Typically, a main function invokes other dependent functions with the main function typically representing the start of a given executable's or software program's functional operation.

Source code 40 may further be broken apart or segmented into one or more code blocks, where each code block comprises a contiguous set of statements that have a single point of entry and a single point of exit. Typically, conditional statements, such as "if-then" statements, "while" statements, "for" statements and the like, defined within source code 40 represent a point of entry, a point of exit, or both a point of entry and a point of exit. That is, each conditional statement of source code 40 may, for example, cause the previous block to terminate and a new block to start. As a function may include one or more of these blocks, segmentation of source code 40 into blocks may enable more granular analysis of the coverage of source code 40 than segmenting source code 40 by functions alone. Dynamic analysis module 34 may, as described below in more detail, operate at this block level to produce coverage data 28 that enables more precise test selection than coverage data 28 generated from functional-level analysis.

Static analysis module 36 may represent a hardware and/or software module that determines dependency data 30 based on source code 40. Static analysis module 36 may perform static analysis to obtain dependency data 30 that identifies dependencies among software components, such as functions and variables (e.g., global variables). In other words, static analysis may involve determining how one function of source code 40 relates to another function of source code 40. For example, the first function may "call" or otherwise invoke a second function. With respect to variables and particularly global variables, a first function may store a value to a global variable, e.g., a variable available for use globally by any function, where this value is then used by a second function. Static analysis module 36 may store the result of this static analysis of source code 40 to test selection database 16 as dependency data 30.

Code change module 38 may represent a hardware and/or software module that determined code change data 32 based on code changes 42. Code changes 42 may comprise a list of statements of source code 40 that changed from a previous version of the software with respect to a new version of the software. A software development tool referred to as "Concurrent Version System" or "CVS," for short, may generate code changes 42. In particular, CVS may implement an operation referred to as "diff" to detect and generate code changes 42. Typically, the diff or differential operation may compare the previous version of the code to the new version and generate code changes 42 as a list of those statements that changed between versions. Code change module 38 may receive these code changes 42 and determine based on code changes 42 which of the functions of source code 40 have changed between versions. Code change module 38 may store these changed functions as a list or another data structure to test selection database 16 as code change data 32.

Test bench 20 may comprise a configurable plurality of computing devices. As shown in FIG. 1, test bench 20 comprises a configurable plurality of routers 44A-44F ("routers 44"). While shown as including only six computing devices or routers 44, test bench 20 may include any number of computing devices. Moreover, while described in this disclosure with respect to a particular type of computing device, e.g., a router, test bench 20 may include any type of computing device including a laptop computer, a desktop computer, a workstation, a cellular phone, a so-called "smart" phone, a Personal Digital Assistant (PDA), as well as, other types of network devices which fall within the broader category of computing devices including a hub, a switch, a bridge, a data server, an application server, a print server, and a database. As a result, the techniques, again, should not be limited to the exemplary embodiment shown in FIG. 1.

Each of routers 44 of test bench 20 may interconnect with every other adjacent one of routers 44. For example, router 44A is adjacent to routers 44B, 44D and 44E and couples to each of these routers 44B, 44D and 44E and so on. This form of interconnection may be referred to as a "full mesh" form of interconnection. Test bench 20 may be configurable in that only a subset of routers 44 may be enabled to form a particular test bed. In the example of FIG. 1, test bench 20 has been configured to simulate a test bed 46 of a particular network architecture, where in this example test bed 46 includes router 44A connected by a network connection to router 44B. With respect to test bed 46, router 44A may only couple to router 44B as routers 44C-44F may not be enabled and, therefore, those routers 44C-44F may not be considered to "interconnect" with routers 44A, 44B respectively.

Although not shown in FIG. 1 for ease of illustration purposes, one or more of routers 44 may execute a new version of software 48 ("S/W 48") similar to that shown in FIG. 1 as being executed by router 44B. Whether each of routers 44 executes this software 48 may, in some instances, depend on the current one of test cases 26 implemented by test bench 20. For example, one of routers 44 may execute an older, more stable or bug/error-free version of software 48 in order to assure that any functional errors or so-called "bugs" detected during testing arise due to deficiencies of the new version of software 48 rather than the old or previous version.

In accordance with the intelligent RTS techniques described herein, regression server 12 may intelligently select a subset of less than all of test cases 26 to implement rather than implement the full regression test suite of all test cases 26. By only selecting a subset of test cases 26, regression server 12 may attempt to balance safety achieved by the application of the testing against a user-selectable precision in order to facilitate the efficiency with which regression testing is performed. "Safety" is used herein to refer to a measurement of the capability of server 12 to select a subset of test cases from the full regression test suite 26 that, when implemented, reveal all functional errors or faults in a new version of the software. These selected ones of test cases 26 may be referred to as "necessary" in that these selected ones of test cases 26 reveal all function errors or faults in the new version of the software. One way to ensure 100 percent safety is for server 12 to select each and every test case 26 of a given regression test suite for implementation, thus guaranteeing that all errors detectable by the test cases are revealed. "Precision" is used herein to refer to a measurement of the capability of server 12 to eliminate those test cases 26 that, when applied to the software being tested, do not reveal a functional error or fault, or reveal only redundant functional errors or faults already revealed by other test cases. To achieve an optimal precision typically requires server 12 to select as few of test cases 26 as possible.

In this respect, the safety and precision metrics run counter to one another in that, for example, 100 percent safety is achieved when, server 12 selects and implements each and every one of test cases 26, thereby reducing the precision, as most likely not all of test cases 26 will identify a fault, let alone a unique fault, in a given software release. However, to enhance the precision, server 12 must forgo some test cases 26 that may, when implemented, reveal a unique fault, thereby reducing safety. In this respect, precision and safety may represent a sliding scale, whereby one end of the scale provides the maximum safety, while the other end of the scale provides the maximum precision.

To illustrate how these metrics interrelate more clearly, server 12 allows the user to select and implement a full regression test suite 26 in a test referred to as "retest-all" regression test. This retest-all regression test may achieve the maximum safety, as it runs entire regression test suite 26 and no fault-revealing ones of test cases 26 are left out. However, this retest-all regression test may have the worst precision in that a final test set (e.g., those test selected and implemented) has a same size or includes a same number of test cases as those included within full regression test suite 26. In comparison, selecting only a subset of test cases 26 in a regression test referred to as a "selective" regression test often risks impaired safety due to the possibly of unintentionally discarding one or more fault-revealing ones of test cases 26. Yet, the selective regression test may have enhanced precision when compared to the retest-all regression test because this test only selects and includes a subset of test cases 26 within the final test set. In this way, the safety and precision metrics run counter to one another.

While 100 percent safety may be favored for major releases to the public, such as a release of a new version of software 48, minor releases, such as an update to the new version of software 48, may not require 100 percent safety before release to the public. Moreover, for internal releases or updates, such as releases or updates only for purposes of development of a public release or update, even less safety may be required than that required for public updates. For example, public updates may require only 90 percent safety, as the update may only impact a small amount of code relative to the total amount of code. Internal releases or updates may require even less safety, such as only 80 or 70 percent safety, as this code is only intended for internal development while quality assurance may be ongoing to detect and troubleshoot any remaining bugs, faults or errors not detected during this scaled back regression testing.

Server 12 may implement the intelligent RTS techniques described herein to achieve a given level of safety, as selected by a user, without requiring execution or implementation of each one of test cases 26 of the full regression test suite, thereby increasing and potentially maximizing precision. In terms of the above safety and precision metrics, server 12 may implement the techniques to achieve a user-selected level of safety with reasonably high precision. Precision may be considered "reasonable" insomuch as the cost of selecting each of test cases 26 does not overshadow or exceed costs associated with actually executing or implementing each of test cases 26. As an example, precision may be considered reasonable if a cost to select each one of test cases 26 equals a set percentage, such as 50 percent, or less of the costs to execute each respective one of test cases 26, where the cost may be represented in terms of computing cycles, resources, power consumption or any other metric. Alternatively, precision may be considered reasonable if the average cost to select the subset of test cases 26 equals the set percentage or less of the costs to execute all of test cases 26. By enabling this dynamic selection of safety, the techniques may facilitate flexible regression testing that bends to meet different safety/precision requirements requested by users during the software development cycle, e.g., major releases, minor releases or updates, internal releases and service releases.

For example, regression server 12 may prompt a user, such as user 50, for the given level of safety required when regression testing software to be released. In some instances, regression server 12 may present a user interface by which to receive data specifying a given level of safety input by user 50. User 50 may specify the given level of safety directly as a percentage or indirectly by selecting or otherwise inputting a handle, moving a slider on a scale from 1 to 100, or other identifier representative of the given level of safety. That is, user 50 may indirectly select the level of safety by interacting with an input mechanism (e.g., dropdown menu) to select one of a set of pre-defined types of software releases, e.g., major, minor, service and internal. Regression server 12, in this indirect instance, may store data that associates each of these pre-defined types of software releases with a corresponding safety percentage that is required by corporate policy.

To illustrate, regression server 12 may store data that representative of a corporate policy that associates major releases with 100 percent safety, minor releases with 90 percent safety, service updates that are released to the public in order to update a small amount of software functionality with 80 percent safety, and internal releases with 70 percent safety. These levels of safety may be configurable by an administrator, and regression server 12 may enable either or both modes of specifying a given service level. In this manner, the intelligent RTS techniques described herein may be configured to adapt regression testing to suite a particular organization software development cycle. While described above with respect to particular release types, in another example user 50 may choose between other handles such as "high" and "moderate" types of safety that are similarly associated with a given level of safety.

Based on this level of safety input by user 50, regression server 12 may first determine whether to implement either a subset or all of test cases 26. If the level of safety equals 100 percent, regression server 12 may select and implement full regression test suite 26. However, assuming the selected level of safety does not equal 100 percent for purposes of illustration, regression server 12 selects a subset of test cases 26 according to the intelligent RTS techniques described herein. In particular, intelligent RTS module 22 of regression server 12 implements the techniques to select a subset of test cases 26 attempts to maximize precision (i.e., by selecting a subset having the least amount of test cases) while still ensuring that safety that meets or exceeds the user-selected level of safety.

In order to select this subset, intelligent RTS module 22 may access coverage data 28, dependency data 30 and code change data 32. As described briefly above, dynamic analysis module 34 generates coverage data 28 by performing dynamic analysis at the block level. To enable this analysis, a user may manually insert tags into source code 40 that identify the start and end of each block. A "tag" may comprise, in some instances, a function call that invokes a flag or tagging function. By using a manually coded function and inserting calls to this function carefully within source code 40 rather than using an automated profiling tool or other automated software development tools, the software developers, testers and other users may craft this flag function so as to minimize its complexity and thereby reduce the impact on the behavior of the software and testing system. While described as being performed manually, this aspect of the techniques referred to as "instrumentation" may be automated and performed on binary executables to be released by using reverse engineering tools or directly on a copy of the original source code by using parsing tools to find line numbers in the high-level software source code in which to insert the tag or flag function call.

As an example, the following represents a portion of source code 40 before this block segmentation or instrumentation:
  ospf_area *
  ospf_find_area (ospf_instance *instance, in_addr area_id)
{
  ospf_area *cur_area;
  FOR_ALL_OSPF_AREAS(instance, cur_area) {
    if (cur_area→ospf_area_id==area_id)
      return(cur_area);
  }
  return(NULL);
}

The following represents this same portion of source code 40 after instrumentation:
  ospf_area *
  ospf_find_area (ospf_instance *instance, in_addr area_id)
{
  flag_white_bx(57866, 7617, 1);
  ospf_area *cur_area;
  flag_white_bx(57867, 7617, 1);
  FOR_ALL_OSPF_AREAS(instance, cur_area) {
    flag_white_bx(57868, 7617, 1);
    if (cur_area→ospf_area_id==area_id) {
      flag_white_bx(57869, 7617, 1);
      return(cur_area);
    }
  }
  flag_white_bx(57870, 7617, 1);
  return(NULL);
}

As shown above, the tag or flag function "flag_white_bx( )" is inserted in various places to denote each block of code, where each block is surrounded by two of these tag or flag functions. The first argument in the "flag_white_bx( )" function call denotes the block identifier (ID), and the second argument denotes the function ID in the above example.

After inserting these "tags," user 50 may compile this tagged source code 40 into tagged software and load this tagged software, which may be represented as software 48, onto test bench 20, e.g., one or more of routers 44. Once loaded, user 50 may implement full regression test suite 26 as a retest-all regression test. As test bench 20 executes each of test cases 26 during this retest-all or full regression test, each of test cases 26 exercise one or more of the blocks of the tagged software identified by the tags. In other words, test cases 26 may, when testing the tagged software, invoke the flag function, which records what block in which function is exercised by this test case. These reports form the association of each one of test cases 26 with a set of block identifiers for every function it exercises. On a function, some test cases may exercise the same set of block IDs and other test cases may exercise different sets of block IDs. Each unique set of block IDs represents a unique way that test cases "cover" this function.

Dynamic analysis module 34 may analyze the full reports and identify all unique block ID combinations generated by all test cases on all source function. It may associate each unique block combination to one or more test cases that generates this particular block ID combination on this particular function, and store this association as coverage data 28. Coverage data 28 may therefore include associations between each one of test cases 26 to those blocks and functions each of the corresponding one of test cases 26 exercise, associations between each unique block combination for every source function to the set of test cases that exercise the function this way, as well as additional information, such as the average time required to execute each one of test cases 26.

Typically, the above dynamic analysis involving manual tag insertion is performed on large software systems where the code base includes thousands if not millions of lines of code. For smaller software systems or programs, users may obtain coverage data 28 using standard profiling tools, such as a software program referred to as "gcov," that may automatically tag source code 40 during compilation of source code 40. These programs may then dump or otherwise generate coverage data 28 when the program exits. Thus, dynamic analysis module 34 may represent either a standard profiling tool or a module by which user 50 may manually and/or automatically insert a call to a flag function into source code 40. User 50 may prefer the more cumbersome manual insertion of flag function calls for large software systems as standard profiling tools may not easily cease operation of this software to dump data. Moreover, since profiling tools are not specifically designed for regression test selection, the tagging overhead is often unnecessarily big, which may have considerable impact on the system behavior that results in the introduction of man-made faults.

As also described briefly above, static analysis module 36 may generate dependency data 30 that maps dependencies among various software components, such as functions and global variables. Dependency data 30 may define a graph or other data structure linking particular functions and variables to one another in the manner described above. Each node of the graph may represent a function or variable. For function nodes, if a function includes a function call invoking another function, the node may include a pointer linking this node to another node that represents the function invoked by the function call. For a function that includes write statements changing or otherwise modifying a variable (e.g., global variable), the node may also include a pointer linking this node to another node that represents the global variable. In this respect, dependency data 30 may comprise a graph defining dependencies between various functions and variables.

With respect to code change data 32, code change module 38 may generate code change data 32 such that code change data 32 indicates those functions altered between one version of source code 40 and another version of source code 40. Code change module 38 may receive code change information or simply code changes 42 as a result of a CVS diff operation or from any other software development tool that can generate this type of code change information 42. In this respect, code change data 32 may define a list of function that have been modified, added or deleted from source code 40 within a designated period of time, such as a time between versions.

Intelligent RTS module 22 may, based on this data 28-32, select a subset of test cases 26 and pass this subset as a final test set 52 to regression harness 24, whereupon regression harness 24 implements those of test cases 26 included in the final test set. In this respect, modules 34-38 may be considered preparation modules that supply coverage data 28, dependency data 30 and code change data 32 for use by intelligent RTS module 22 in selecting final test set 52.

Intelligent RTS module 22 may first retrieve dependency data 30 and code change data 32. Intelligent RTS module 22 may based on this data generate a list that includes both changed and impacted functions. While code change data 32 defines the list of changed functions, e.g., those functions whose lines of code have changed between versions of source code 40, intelligent RTS module 22 may derive the impacted functions, e.g., those functions whose lines of code have not changed but have been impacted between versions, based on the list of changed functions and dependency data 30. Intelligent RTS module 22, as described below, may derive the impacted functions using a distance metric that indicates impact strength of an arbitrary software component towards another software component. Resolving the impacted functions may increase or enhance the safety as it may be important to test or retest not only the changed functions, but also those that are most likely to be impacted by the changed components. Notably, increasing the distance metric may reduce the precision but increase safety, while reducing the distance metric may improve precision but decrease safety.

An immediate association having a distance equal to one may, for example, comprise a direct function call, where a first function calls or invokes a second function. A code change to the first function may therefore directly impact the second function. If the second function calls a third function, a code change to the first function may then less directly impact the third function call, especially if the second function was not changed. In this respect, intelligent RTS module 22 may analyze the graph or other data structure defined by dependency data 30 to resolve which functions are impacted given a particular distance.

Thus, if the max impact distance $D_{max}$ is set to 2 in the above example and the first function has changed, intelligent RTS module 22 may determine that the first function has changed and both the second and third functions have been impacted as both the second and third functions exist at or below the given distance of two from the first function. If $D_{max}$ was set to one, however, intelligent RTS module 22 may determine that only the second function is impacted, as the third function resides two step and therefore at a distance greater than the given distance of one. In this way, intelligent RTS module 22 may determine those of the functions of source code 40 whose lines of code have not changed but have been impacted by the changes based on dependency data 30 and the previously determined changed functions.

Intelligent RTS module 22 may then access coverage data 28 that defines the mapping between unique block combinations and test cases that produce such coverage over each corresponding functions. As described above, each of the blocks comprises a contiguous block of source code 40 having a single point of entry and a single point of exit. Based on this coverage data 28, intelligent RTS module 22 may select a subset of test cases 26 that may exercise both the changed and impacted functions.

Intelligent RTS module 22 may implement an adaptive-combo test selection algorithm that may adaptively apply one or more, e.g., a combination or combo of, test selection algorithms to select the subset of test cases. Particular, intelligent RTS module 22, in accordance with the adaptive-combo algorithm, may retrieve a function from this list and select test cases for this first function by implementing a first test selection algorithm referred to as "FULL-SET." This FULL-SET algorithm provides maximum safety as it selects every test case from the full regression test suite that exercises any part (block) of this first or current function.

To make this selection, intelligent RTS module 22 may access coverage data 28 to iteratively retrieve the function-level block coverage for each test case. Intelligent RTS module 22 may then, in accordance with the FULL-SET algorithm, selects those test cases who exercises any block of the current function.

The server may then compare the number of test cases selected for this function to an $N_{max}$ variable, which defines the maximum number of test cases that the server can select for each function. In this respect, the $N_{max}$ variable may represent a configurable knob or variable by which the techniques may preserve precision. If the value of the $N_{max}$ variable is less than the number of test cases selected for the current function using FULL-SET algorithm, meaning the number of selected test cases of the FULL-SET algorithm is so large that it has exceeded the precision requirements configured by $N_{max}$, intelligent RTS module 22, in accordance with the adaptive-combo algorithm, implements another test selection algorithm referred to as a "COMBO-SET(x)" algorithm, with x initially set to a value of an $X_{max}$ variable.

For the COMBO-SET(x) algorithm, every unique block combination for the test function must select x test cases if available. Here, x sets an upper limit on the number of test cases that the server may select, when implementing the COMBO-SET(x) algorithm, for each unique block combination on the test function. Suppose a total of 'n', where 'n' is greater than zero (n>0), test cases have the same block combination coverage over a given test function, the COMBO-SET(x) algorithm selects all n test case when x is greater than or equal to n (x>=n), and it selects 'x' out of 'n' test cases (possibly based on an efficiency metric, such as the average test case execution time), when 'x' is less than n (x<n). Therefore, a larger 'x' yields more test selection redundancy in the COMBO-SET(x) n algorithm. If 'x' is large enough, COMBO-SET(x) becomes equivalent to FULL-SET. The COMBO-SET(x) algorithm applies this same procedure to all unique block combinations for a particular one of test functions or cases stored in the coverage data module 28.

Considering a simple example of COMBO-SET(x) algorithm with x set to one (1), e.g., COMBO-SET(1), coverage data 28 may indicate that test case 26A exercises blocks 1-3 of a function, and test case 26B exercises blocks 2-4 of the same function. Assuming intelligent RTS module 22 determines that this function is either changed or impacted, intelligent RTS module 22 may then select test cases for all uniquely exercised block combinations of this function. Considering that test cases 26A, 26B both exercise a different set of blocks, and in the COMBO-SET(1) implementation, every unique block combination can select no more than 1 test case, intelligent RTS module 22 may select both of test cases 26A, 26B. However, if both test cases 26A and 26B exercise the same set of blocks 1-3 of this function, intelligent RTS module 22 may select only one test case for this specific block combination and discard the other. The selection criterion may be based on the average test execution time stored in Coverage data 28 to improve efficiency.

If the adaptive-combo algorithm once executed by intelligent RTS module 22 fails to find a test set with enough precision using FULL-SET algorithm, intelligent RTS module 22 executes the more precise COMBO-SET(x) algorithms, with x initialized to the maximum value $X_{max}$, i.e., the safest yet least precise one in the whole COMBO-SET algorithm suite. After selecting test cases for each unique block combination of a given function in the above manner, intelligent RTS module 22 may add up each of these selected test cases over all of the unique block combinations for the function. Intelligent RTS module 22 may then compare the number of selected test cases to the $N_{max}$ variable. If the number of selected test cases for the function exceeds the $N_{max}$ variable, meaning COMBO-SET($X_{max}$) does not satisfy the precision requirement configured by $N_{max}$, intelligence RTS module 22 may decrement the x value, and reiterates the COMBO-SET ($X_{max}$–1) algorithm with the decremented x value. In this way, intelligent RTS module 22 keeps seeking the safest possible algorithm in COMB-SET suite that may meet the precision requirement, $N_{max}$. Further, by utilizing metric like average test case execution time in test selection, the techniques may not only ensure precision by way of the $N_{max}$ variable but also ensure that this precision is achieved with reasonable efficiency.

Intelligent RTS module 22 continues in this manner until the x value is less than one, meaning the most precise (least safe) candidate in the COMBO-SET(x) algorithm suite is still not precise enough, or the number of test cases selected for the function is less than $N_{max}$ or the maximum test case limit per function, meaning this COMBO-SET(x) has returned a set of test cases satisfying the precision requirement defined by $N_{max}$. Upon determining that the x value is less than one, intelligent RTS module may implement a third algorithm referred to as "MIN-SET," which selects test cases so that every block of the current function is covered by at least one test case. The "MIN-SET" algorithm therefore may therefore represent the most precise algorithm of the three.

If at any point while implementing these three algorithms the number of test cases selected for the current function is less than or equal to $N_{max}$, intelligent RTS module 22 notes the selected test cases and retrieves the next function on the changed and impacted functions list. After selecting test cases in this manner for each of the functions on the list, intelligent RTS module 22 aggregates the selected test cases into a final test set and executes these test cases as a regression test of the software compiled form the source code. The final test set may represent a set of test cases that achieves the desired level of safety selected by the user.

As described above, intelligent RTS module 22 may be limited to a maximum number of test cases 26 intelligent RTS module 22 can select for each changed or impacted function. This maximum test case limit, e.g., $N_{max}$, may be either statically or dynamically configured. With respect to specifying the given level of safety by way of a handle, e.g., "high" or "medium," both the above described distance and maximum test case limit may be configured with respect to these handles. In other words, user 50 may select the high level of safety and intelligent RTS module 22 may, based on this selection, set or configure the given level of safety to 90 percent, the distance metric to two, and the maximum number of test cases to 40. Regardless, limiting the number of test cases may improve precision but sacrifice safety, although the sacrifice of safety may be minimal while the improvement of precision may be drastic.

Notably, intelligent RTS module 22 may always attempt to include each and every one of test cases 26 that exercise each of the changed and impacted functions by way of first implementing the FULL-SET algorithm, scaling back to the COMBO-SET algorithms, and finally settling on the MIN-SET algorithm if necessary. In this respect, intelligent RTS module 22 seeks to maximize safety. However, the maximum test case limit may limit this attempt to maximize safety so as to preserve or improve precision. Moreover, by replacing those test cases having high execution times with those having lower execution times, intelligent RTS module 22 may further promote the above described "reasonable" precision and thereby improve regression testing performance while ensuring a given level of safety.

In any event, intelligent RTS module 22 may, for each changed and impacted function, determine one or more test cases 26 that exercise and, in some instances uniquely exercise, each of these changed and impacted functions to select a subset of test cases 26 from the full regression test suite. Intelligent RTS module 22 may forward this subset as final test set 52 to regression harness 24, which may implement the subset of test cases 26 within test bench 20. That is, regression harness 24 may execute the subset of test cases 26 to ensure that the given level of safety results from this regression testing of software program 48 compiled from source code 40.

Intelligent RTS module 22 may be configured to select the subset of test cases 26 such that, when this subset is implemented, it achieves the given level of safety. User 50 may experimentally set the distance and maximum test case limit, invoke intelligent RTS module 22 to select the subset, implement the subset and observe the results. User 50 may then look to the result of past full regression tests (or retest-all regression tests) and compare the result of the subset or selection regression test with those of the past retest-all regression tests. User 50 may, for example, compare the number of bugs caught by the retest-all regression test and the selection regression test as well as the number of tests selected by each. User 50 may continue to adjust these two metrics to achieve the given level of safety and then define or configure profiles for each level of safety and associate handles, such as those listed above, with each profile.

In this manner, intelligent RTS module 22 may implement the intelligent Regression Test Selection (RTS) techniques to select a subset of test cases in order to balance the tradeoffs between safety and precision and facilitate the efficiency with which regression testing is performed. The intelligent RTS techniques described herein adopts block-level instrumentation that may be easy to implement yet sufficiently fine-grained to yield efficient results. Considering the above discussion, the intelligent RTS techniques may be characterized as a self-adaptive test selection algorithm that effectively controls the precision of the test selection outcome while eliminating the possibility of producing a large final test set. Furthermore, these techniques may automatically adjust the operational level to maximize safety without violating the precision constraint.

Figure 2:
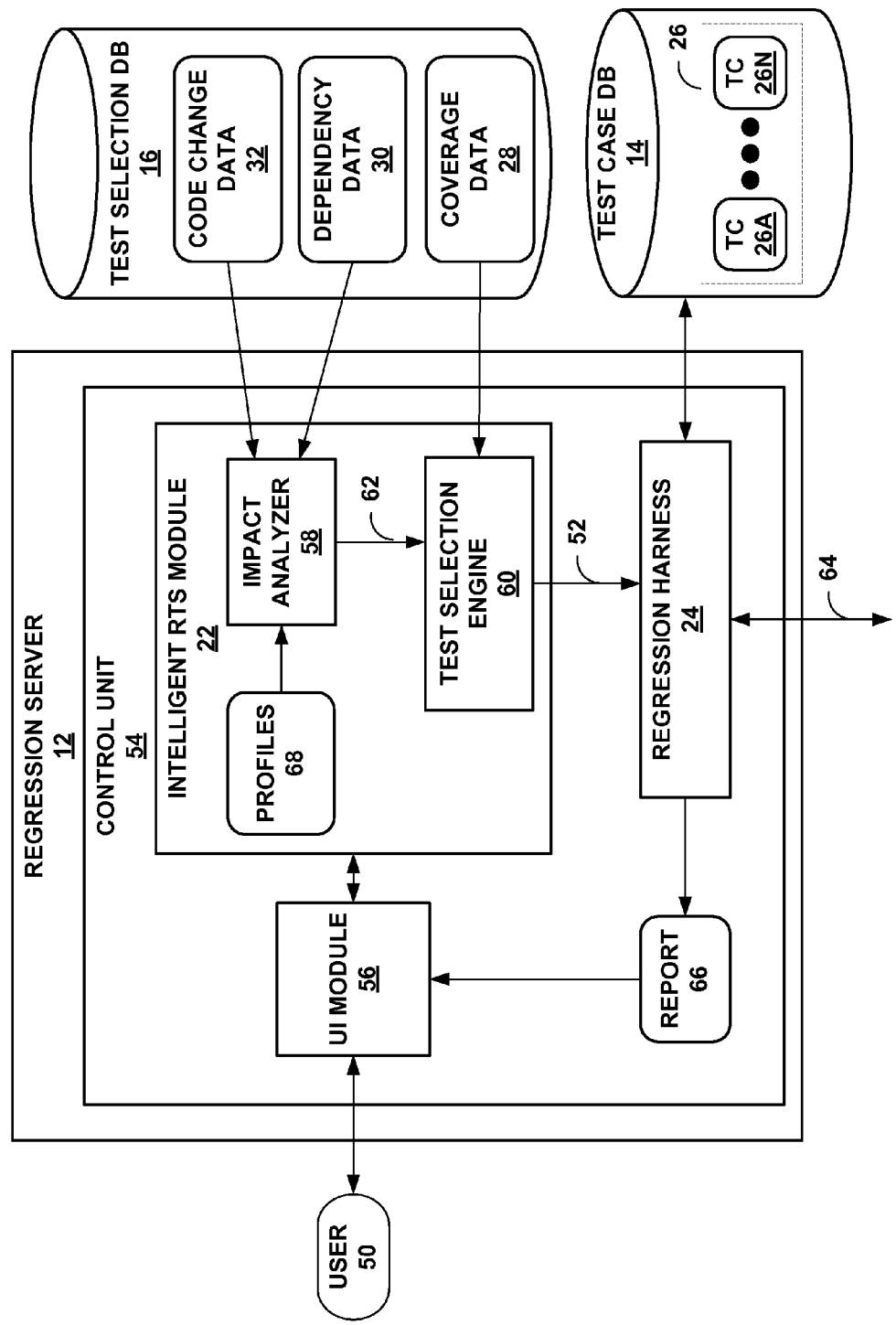
FIG. 2 is a block diagram illustrating an exemplary embodiment of the regression server of FIG. 1 in more detail.

FIG. 2 is a block diagram illustrating an exemplary embodiment of regression server 12 of FIG. 1 in more detail. In the example of FIG. 2, regression server 12 includes a control unit 54 that executes both of intelligent RTS module 22 and regression harness 24. Control unit 54 may comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 54 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 54 may execute, in addition to intelligent RTS module 22 and regression test harness 24, a User Interface (UI) module 56 ("UI module 56") by which control unit 54 may interface with user 50. UI module may present a user interface with which user 50 may interact to enter input or data defining the given level of safety, the distance metric and/or the maximum test case limit. Alternatively, user 50 may interact with the user interface presented by UI module 56 to enter input or data selecting a handle representative of one or more of the above three variables ($N_{max}$, $D_{max}$ and $X_{max}$).

As further shown in FIG. 2, intelligent RTS module 22 may comprise two sub-components, e.g., an impact analyzer 58 and a test selection engine 60. Impact analyzer 58 may represent a hardware and/or software module that generates the above described list of changed and impacted functions based on code change data 32 and dependency data 30. In particular, impact analyzer 58 may access test selection database 56 to retrieve code change data 32 and dependency data 30 or, in other words, the changed functions output from dynamic analysis and the impact distance data from the static analysis. Based on this input, impact analyzer 58 may generate changed and impacted functions list 62. Test selection engine 60 may represent a hardware and/or software module that selects a subset of test cases 26 based on changed and impacted function list 62 and coverage data 28. Test selection engine 60 may generate this subset as final test set 52.

Initially, during a preparatory phase of the regression testing, user 50 may generate data 28-32. In particular, user 50, in one instance, may interact with computing device 18 to cause dynamic analysis module 34, static analysis module 36 and code change module 38 to generate respective data 28-32. User 50 may input or otherwise supply information or other data necessary to generate data 28-32, such as the full set of test cases or full regression test suite 26, source code 40, and code change information 42.

After preparing this data 28-30, control unit 54 may prompt user 50 for a given level of safety. In particular, UI module 56 of control unit 54 may present a user interface with which user 50 interacts to select or otherwise specify the given level of safety. While user 50 may, in some instances, specify this given level of safety as a percentage, it is assumed herein for purposes of illustration that the user interface prompts user 50 to select a handle representative of a given level of safety. For example, the user interface may provide the following selections or handles: "major release," "minor release," "service release," and "internal release." Alternatively, the user interface may provide the following selections or handles: "high safety" and "moderate safety." User 50 may statically or dynamically associate these handles with a given distance metric and maximum test case limit that user 50 determines via verification tests to yield a given level of safety.

User 50 may, as described briefly above, utilize intelligent RTS module 22 to select test cases for past versions of software on which a full regression test or "retest-all" regression test has been performed. User 50 may, for these verification tests, manually input the distance metric and a maximum test case limit, whereupon intelligent RTS module 22 outputs a final test set 52 based on these manually input metrics. Regression harness 24 may execute or implement those of test cases 26 included within final test set 52 and observe results 64. Regression harness 24 may generate report 66 based on results 64, whereupon UI module 56 may present report 66 to user 50. User 50 may compare report 66 to the "retest-all" report and, based on this comparison, determine a given level of safety. If the given level of safety meets a level of safety desired for a certain phase of the software development cycle, e.g., a major, minor, service or internal release, user 50 may interact with a user interface presented by UI module 56 to define one of profiles 68. That is, user 50 may input data that associates a handle with a distance metric and a maximum test case limit and store this data as one of profiles 68. User 50 may also input data for this one of profiles 68 that associates a given level of safety, e.g., a safety percentage, with this one of profiles 68.

If the given level of safety does not meet a desired level of safety for a certain phase of the software development cycle, user 50 may change the distance metric and/or the maximum test case limit and perform the above process once again to determine whether the new distance metric and/or maximum test case limit achieve the desired level of safety. In this respect, user 50 may iteratively update the distance metric and/or the maximum test case limit to define profiles 68. While described as a manual process whereby user 50 continually interacts with UI module 56 to define profiles 68, this profile definition process may occur automatically. For example, user 50 may provide the previous results of the "retest-all" full regression test, one or more handles and one or more levels of safety desired for each of the one or more handles, whereupon control unit 54 may iteratively update the distance metric and/or maximum test case limit until each of the desired levels of safety are achieved. This automated process may facilitate the ease and efficiency with which profile definition occurs.

Typically, a distance value, which may be represented by the variable $D_{max}$, equal to one or two achieves many of the desired levels of safety while not detracting too substantially from the precision. If $D_{max}$ is set to larger values, the precision disadvantage may tend to override the safety advantage. For example, maximum test case limits, which may be represented by the variable $N_{max}$, of 20 and 100 may, when $D_{max}$ is set to 1, achieve safety levels of approximately 80% and 90%, respectively. These examples are discussed below in more detail.

In any event, user 50 may select a handle by interacting with a user interface presented by UI module 56, where the handle indicates one of profiles 68. UI module 56 may pass this handle to intelligent RTS module 22, which may select one of the plurality of profiles 68 based on this received handle. Impact analyzer 58 may receive this selected one of profiles 68 and determine a distance metric specified by the selected one of profiles 68. Impact analyzer 58 may generate an aggregation of changed and impacted functions based on this empirically determined maximum distance value, which may be represented as variable $D_{max}$. For each of the functions having an impact "distance" smaller than or equal to $D_{max}$ towards the changed functions, impact analyzer 58 includes these functions as impacted functions within changed and impacted functions list 62. Again, the operation of impact analyzer 58 is described in more detail below. Impact analyzer 58 forwards changed and impacted function list 62 to test selection engine 60.

Upon receiving this list 62, test selection engine 60 begins selecting those of test cases 26 that uniquely cover those changed and impacted functions indicated by list 62. In other words, for each function in changed and impacted function list 62 output by impact analyzer 58, test selection engine 60 selects test cases 26 for this function. The union of all of the selected ones of test cases 26 represents final test set 52. Test selection engine 60 may implement a test selection algorithm constructed as a combination of three generic algorithms referred to herein respectively as "MIN-SET," "COMBO-SET(x)" and "FULL-SET." Notably, each of these three algorithms is heuristic. In this respect, test selection engine 60 may adapt application of each of these algorithms to achieve a desired level of safety while also ensuring a reasonable level of precision. This algorithm implemented by test selection engine 60 in accordance with the intelligent RTS techniques described herein may therefore be referred to as an "adaptive-combo" algorithm.

The MIN-SET algorithm may comprise an algorithm that selects test cases by requiring that every block in every function under the influence of the modified components should be exercised by at least one test case if available. If certain blocks are not exercised by any one in test cases 26, no test case selection is made for them. However, as long as a block has one or more covering test cases, at lease one test case should be selected for this block. This MIN-SET algorithm typically yields good precision and low test selection cost, e.g., "reasonable" precision, but safety is often low, due to the high likelihood of discarding fault-revealing test cases. The COMBO-SET(x) algorithm relies on the uniqueness of block combinations to conduct test case selection, where "x" refers to the maximum number of test cases allowed to be selected for every unique block combination over a function. In this respect, a larger "x" value generally results in a safer yet less precise COMBO-SET algorithm. The FULL-SET algorithm attempts to provide 100% safety under certain assumptions or criteria, but usually suffers from poor precision. This FULL-SET algorithm may, for example, require test selection engine 60 select all test cases that cover a changed or impacted function. Typically, those test cases 26 selected by the FULL-SET algorithm are close or equivalent to the full regression test suite, thereby yielding poor precision.

Rather than implement any one of these algorithms to select a subset of test cases 26, test selection module 26 may attempt to achieve the highest safety under the precision constraint of $N_{max}$. In other words, test selection engine 60 may, for each algorithm, attempt to implement the FULL-SET algorithm to select every one of test cases 26 that exercise the given function. If the number of test cases 26 exceeds $N_{max}$, test selection engine 60 may implement the COMBO-SET algorithm with x set to $X_{max}$, where $X_{max}$ may equal a statically or dynamically defined limit on the COMBO-SET algorithm, as described in more detail below. Briefly, the "$X_{max}$" value may be empirically determined similar to $N_{max}$ and $D_{max}$ and, in this respect profiles 68 may specify or define this $X_{max}$ value.

Returning to the adaptive-combo algorithm, if the COMBO-SET($X_{max}$) algorithm returns a number of test cases 26 that exceeds $N_{max}$, test selection engine 60 again implements the COMBO-SET($X_{max}$-1) algorithm. Test selection engine 60 continues in this manner and, if the number of selected test cases 26 continues to exceed $N_{max}$, test selection engine 60 eventually implements the MN-SET algorithm. The result of this algorithm is then returned for the given function and test selection engine 60 proceeds to the next function. If anyone of the above algorithms, however, selects a number of test less than or equal to $N_{max}$, test selection engine 60 uses the set of selected test cases 26 for the given function.

In this manner, the adaptive-combo algorithm may always attempt to use the FULL-SET algorithm before resorting to less safe algorithms. The adaptive-combo algorithm may, as a result, be characterized as adopting a "greedy" approach in its attempt to ensure safety over precision. Thus, given $N_{max}$, which again is defined as the maximum number of test case per function allowed, the adaptive-combo algorithm examines the result of every generic algorithm by first evaluating the coverage under the FULL-SET algorithm, then the COMBO-SET ($X_{max}$) algorithm, the COMBO-SET($X_{max}$-1) algorithm, . . . , COMBO-SET(1), and finally the MIN-SET algorithm. As the name suggests, the adaptive-combo algorithm adaptively applies a combination of algorithms until the number of test cases selected for a particular changed or impacted function, which may be represented by the variable "M," is less than or equal to $N_{max}$. Accordingly, user 50 may effectively control how test selection engine 60 selects test cases by specifying different $N_{max}$ and $X_{max}$ values.

After formulating the union of all selected ones of test cases 26 into final test set 52, test selection algorithm 60 forwards final test set 52 to regression harness 24, which proceeds to implement or execute those of test cases 26 included within final test set 52. Regression harness 24 may receive error, warning, alerts or other indications of functional issues with respect to the functional operation of software 48 during regression testing as results 64 and compile or otherwise aggregate these results 64 into report 66. UI module 56 may present this report to user 50 via a user interface or otherwise enable user 50 to access report 66 so as to enable user 50 to generate Problem Reports (PRs). Software developers may then utilize these problem reports to troubleshoot or otherwise resolve the functional errors reported as results 64 by regression harness 64. By avoiding a full regression test, the intelligent RTS techniques may enable quicker and more efficient regression testing of software as well as flexible regression testing to suite particular software development cycles.

Figure 3:
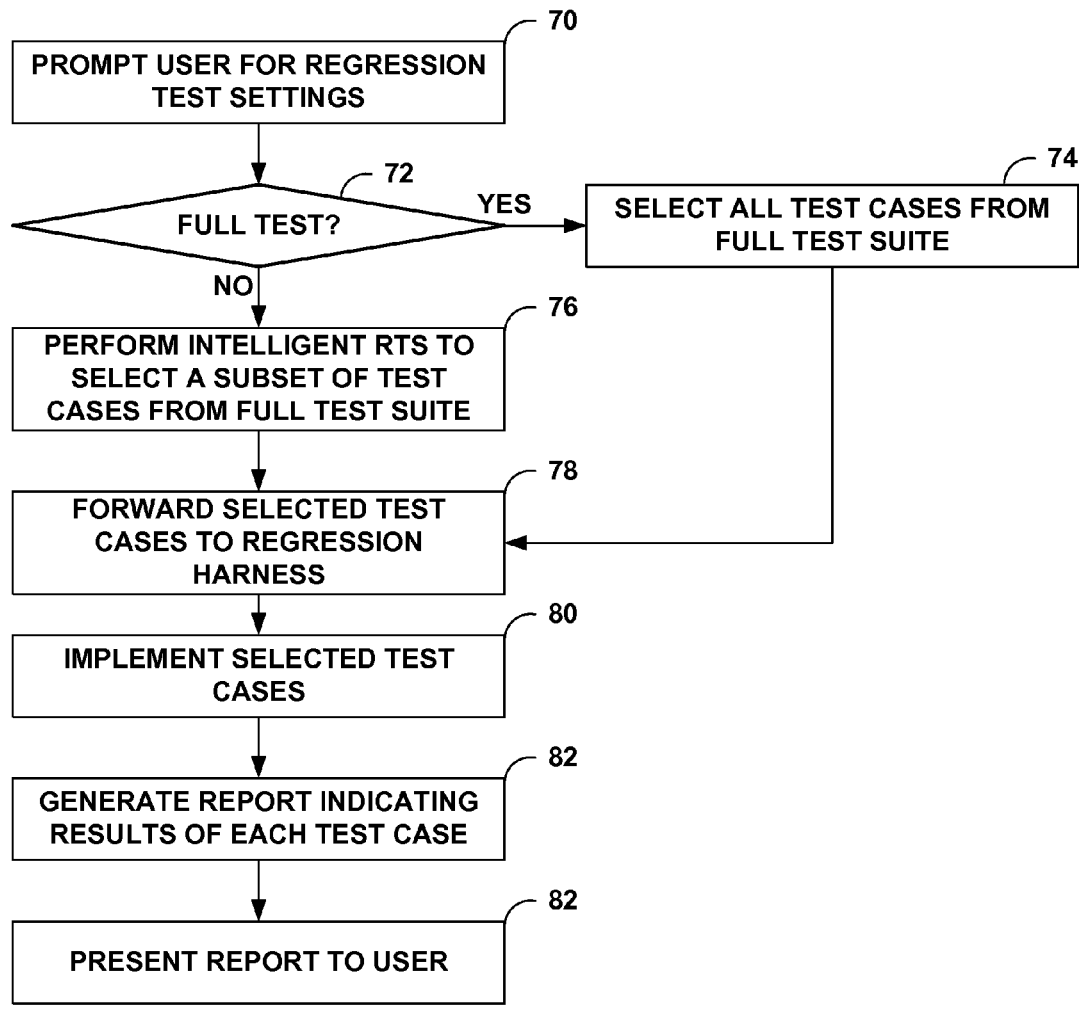
FIG. 3 is a flowchart illustrating an example operation of a computing device in performing the intelligent RTS techniques described in this disclosure.

FIG. 3 is a flowchart illustrating an example operation of a computing device, such as regression server 12 of FIG. 2, in performing the intelligent RTS techniques described in this disclosure. While described with respect to regression server 12, the techniques may be implemented by any computing device capable of selecting a subset of test cases for regression or any other form of software, hardware or a combination of hardware and software testing and/or analysis.

Initially, UI module 56 of control unit 54 included within regression server 12 may prompt a user, such as user 50, for regression testing settings by presenting a user interface, such as a Graphical User Interface (GUI) or a Command Line Interface (CLI), to user 50 (70). Typically, this user interface provides a plurality of handles or selections and user 50 may interact with the user interface to select or otherwise input data indicating one of the handles or selections. As described above, the handles may identify phases of the development cycle, e.g., "major release," "minor release," "service release," and "internal release," or may indicate general levels of safety, such as "full," "high," "moderate" and "low." The user may select one of these handles, which may correspond to one of profiles 68, and UI module 56 may receive this selection, whereupon UI module 56 forwards this selection to intelligent RTS module 22.

Based on this selection, intelligent RTS module 22 may determine whether the selected handle corresponds to one of profiles 68 requiring a full regression test (72). In some instances, UI module 54 may make this determination or, in other words, certain handles may be "hard-coded" into UI module 54 such that upon receiving this selection, UI module 54 interacts directly with regression harness 24 to begin a full regression test. In this instance, if UI module 54 receives a selection of other handles from user 50, UI module 54 may then forward this handle to intelligent RTS module 22.

Assuming the UI module 54 does not make this decision, intelligent RTS module 22 may determine whether a full regression test is indicated by accessing the corresponding one of profiles 68 indicated by the received handle. If, for example, this identified one of profiles 68 defines a level of safety as 100 percent ("YES" 72), intelligent RTS module 22 may select all of test cases 26 from the full regression test suite (74). However, if, for example, the identified one of profiles 68 defines a level of safety as less than 100 percent and further defines the above described $D_{max}$, $N_{max}$ and $X_{max}$ values ("NO" 72), intelligent RTS module 22 may implement the adaptive-combo algorithm in accordance with the intelligent RTS techniques described herein to select a subset of test cases 26 from the full regression test suite in the manner described above (76). In either event, intelligent RTS module 22 may pass an indication or list of the selected ones of test cases 26 to regression harness 24 as final test set 52 (78).

Upon receiving final test set 52, regression harness 24 may, as described above, implement those selected ones of test cases 26 and generate a report 66 indicating results 64 determined from implementing each of the selected ones of test cases 26 (80, 82). Regression harness 24 may store report 66 or otherwise maintain report 66 such that user 50 may access report at a later time. Regression harness 24 may also after completing the regression test present report 66 to user 50 for use in troubleshooting so-called "bugs" or functional errors in software 48 (84).

Figure 4A:
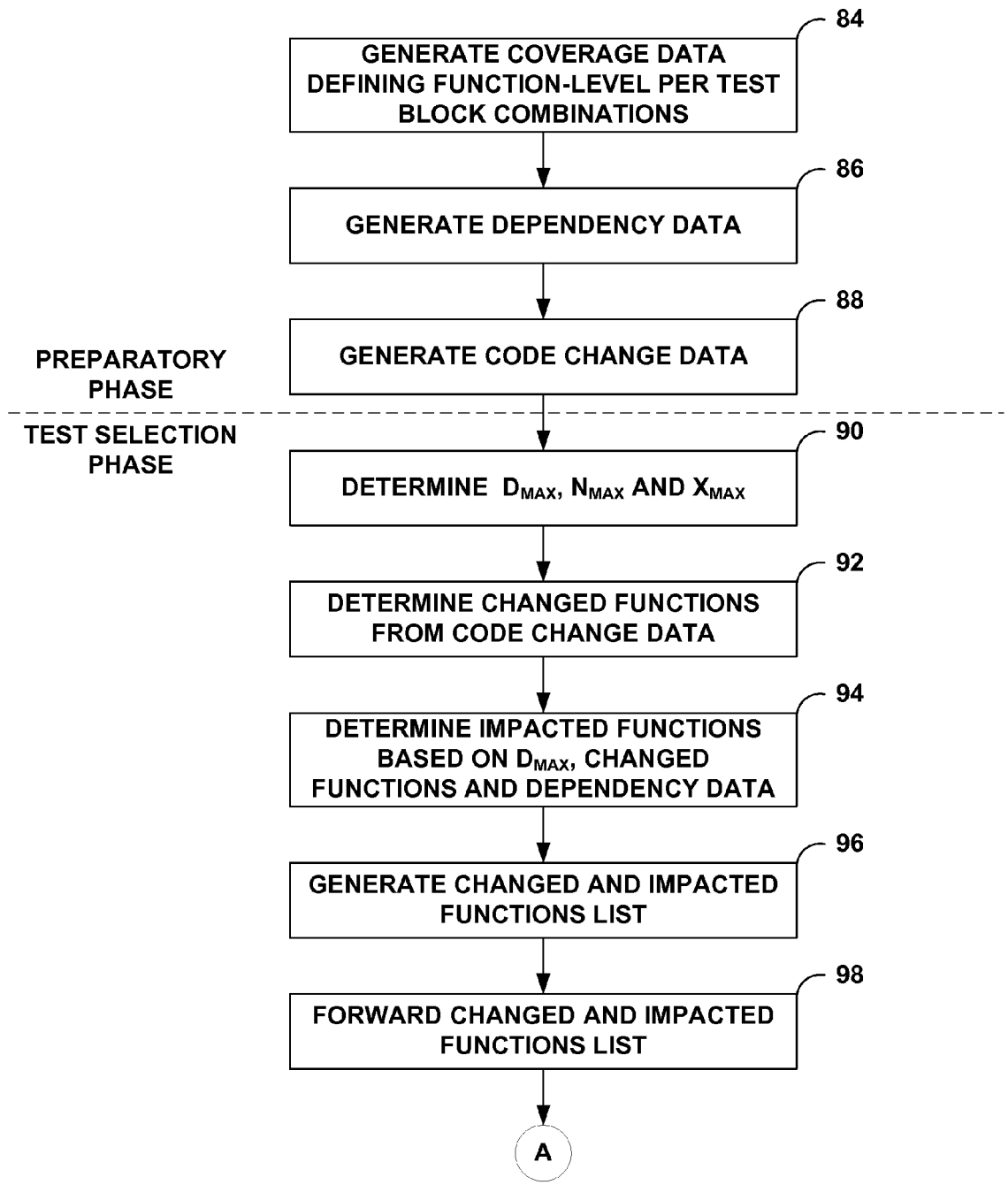
FIGS. 4A-4C are flowcharts illustrating the above described exemplary operation of the computing device in more detail.
Figure 4B:
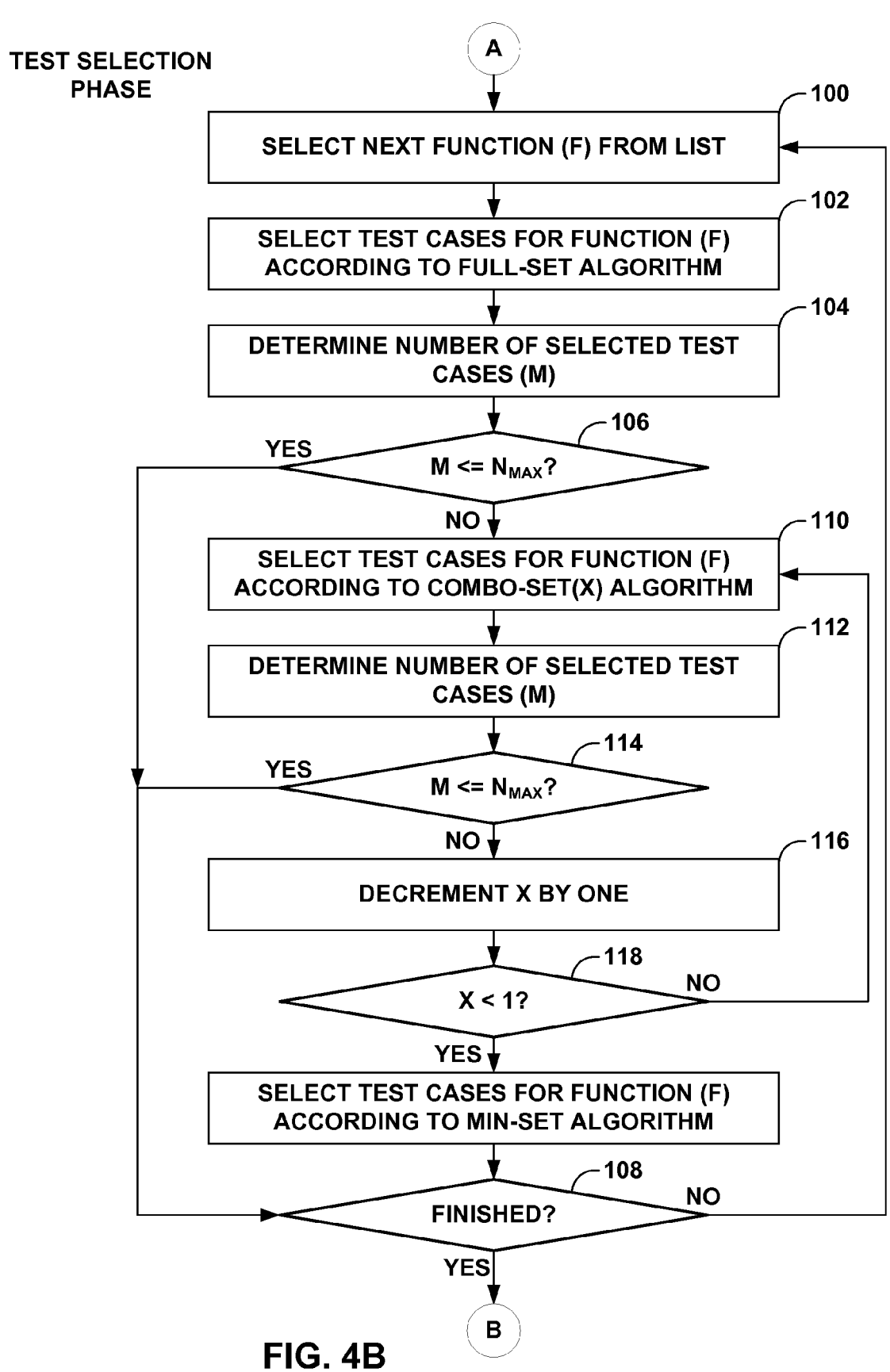
Figure 4C:
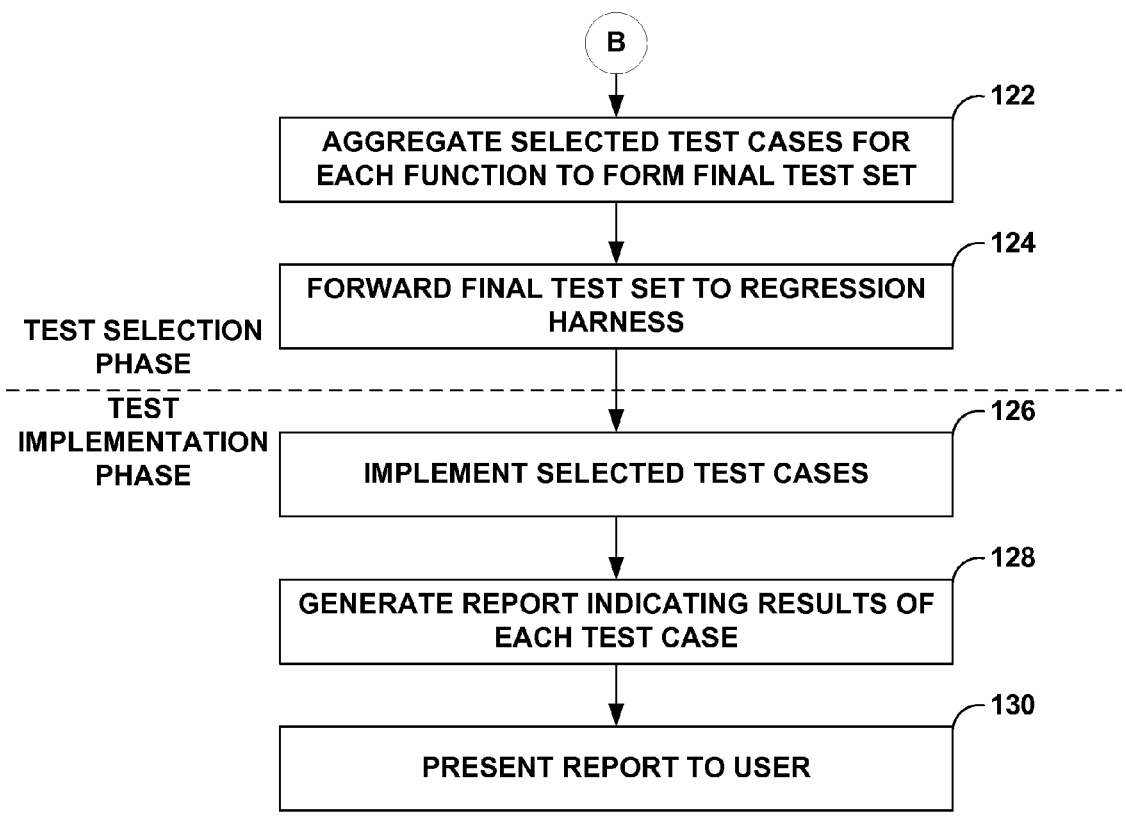

FIGS. 4A-4C are flowcharts illustrating the above described exemplary operation of a computing device, such as regression server 12 of FIG. 2, in more detail. In particular, FIGS. 4A-4C illustration exemplary operation of intelligent RTS module 22 in implementing the above described adaptive-compo algorithm in accordance with the intelligence test selection techniques described in this disclosure. While described mainly with respect to this intelligent RTS module 22, FIGS. 4A-4C are generally divided into two phases of regression testing. The first phase comprises a preparatory phase in which computing device 18 generates data 28-32. The second phase comprises the test selection phase in which intelligent RTS module 22 selects a subset of the full set of test cases 26 and passes these selected test cases to regression harness 24 as final test set 52. The third phase comprises a test implementation phase in which regression harness 24 implements the selected subset of tests.

Initially, as shown in FIG. 4A, regression testing may begin with a preparatory phase. During this phase, computing device 18 generally and particularly modules 34-38 (shown in FIG. 1) may generate coverage data 28 (that defines function-level block combinations per test case), dependency data 30 and code change data 32, as described above (84-88).

After completing this preparatory phase, regression testing proceeds to the test selection phase. Again, referring to FIG. 4A, intelligent RTS module 22 determines $D_{max}$, $N_{max}$ and $X_{ma}$ (90). As described above, these various values may be manually input in that control unit 54 may cause UI module 56 to present a user interface that prompts user 50 for these values. Alternatively, these values may be associated with a handle and a safety level in that profiles 68 may include data defining these associations. UI module 56 may present these handles, or in some cases, profiles 68 to user 50 via a user interface with which the user interacts to select one of profiles 68. In either way, intelligent RTS module 22 may determine these values.

After determining these values $D_{max}$, $N_{max}$ and $X_{max}$, impact analyzer 58 of intelligent RTS module 22 may determine the changed functions from code change data 32 in the manner described above. Impact analyzer 58 may then, based on $D_{max}$, the changed functions and dependency data 30, determine the impacted functions, also as described above (94). Next, impact analyzer 58 aggregates the determined changed and impacted functions into a list referred to as changed and impacted function list 62 and forwards list 62 to test selection engine 60 (96, 98).

Referring to FIG. 4B, test selection engine 60 continues the test selection phase by selecting a next function (which may be represented by variable F) from list 62, which in this instance represents the first function of list 62 (100). For this function, test selection engine 60 implements the adaptive-combo algorithm to select those test cases that "cover" this particular function. As described above, the adaptive-combo algorithm combines three algorithms and applies these algorithms in a particular order to balance safety with precision.

In terms of more formal mathematic propositions, the adaptive-combo algorithm may address a problem formulated as follows:

Inputs
1. Given a function F, it contains a total number of P blocks denoted by $B_F = \{b_1, b_2, \ldots, b_P\}$.
2. Given a full regression suite consisting of N candidate test cases denoted by $T_c = \{t_1, t_2, \ldots, t_N\}$. The code coverage of an arbitrary test case $t_n$ ($1 \leq n \leq N$) over F, represented by the block combination that $t_n$ exercises on F, is denoted as $B_n = \{b_{n1}, b_{n2}, \ldots, b_{nK_n}\}$, where $0 \leq K_n \leq P$ is the total number of blocks that $t_n$ covers in F.
3. Let $B_m$ and $B_n$ denote the block combinations of test cases $t_m$ and $t_n$ over function F, respectively. Then $B_m$ and $B_n$ are considered equivalent if they contain the exactly same set of blocks. For example, $\{b_1, b_2, b_3\}$ is considered equivalent to $\{b_2, b_3, b_1\}$. Hence, it is given that N candidate test cases yield a total of L unique block combinations on F, denoted by $UB = \{UB_1, UB_2, \ldots, UB_L\}$.
4. The average runtime of every test case is given. This metric will be used to break ties when two test cases have exactly the same coverage on F and a selection is required to be made.

Objective

To select a final test set $T \subset T_{max}$ such that, for an arbitrary change on function F, $\overline{\text{re-running}}$ T should approach the safety of re-running $T_c$ as much as possible.

First, test selection engine 60 selects those of test cases 26 that "cover" the current function according to the FULL-SET algorithm (102). This FULL-SET algorithms selects all of test cases 26 that cover the function (F). In other words, test selection engine 60 accesses coverage data 32 and selects any of test cases 26 whose function-level block coverage contains any block(s) in this function (F). Test selection engine 60 then determines the number of selected test cases, which may be represented by the variable M and compares this number M to the maximum test case limit $N_{max}$ (104, 106).

If M is less than or equal (<=) to $N_{max}$ ("YES" 106), test selection engine 60 notes the selected ones of test cases 26 for later aggregation into final test set 52 and determines whether all functions have been analyzed, e.g., whether the adaptive-combo algorithm is finished (108). If M is not less than or equal to $N_{max}$ ("NO" 106), test selection engine 60 aborts the FULL-SET results and continues to execute according to the adaptive-combo algorithm by implementing the COMBO-SET(x) algorithm to reselect a subset of test cases 26 that cover current function F, where x is initially set to the predetermined $X_{max}$ (110).

Mathematically, the COMBO-SET(x) algorithm may be described as the following series of steps to solve the problem identified above within the above stated objective:

1. Initialize $T=\Phi$. Let us assume that a total of $X_l$ test cases yield the same unique block combination $UB_l$ on F, for an arbitrary $UB_l$ ($1 \leq l \leq L$).
2. For each unique combination in UB, denoted by $UB_l$ ($1 \leq l \leq L$), conduct the following test selection step. If $X_l \geq x$, select x test cases $T_l = \{t_{l1}, t_{l2}, \ldots, t_{lx}\}$ that have the shortest run time from these $X_l$ test cases. If $X_l < x$, then select all $X_l$ test cases $T_l = \{t_{l1}, t_{l2}, \ldots, t_{lX_l}\}$.
3. The union of all selected test cases is the final solution $T = T_1 \cup T_2 \cup \ldots \cup T_L$.

Test selection engine 60 then determines the number of selected test cases, which may be represented by the variable M and compares this number M to the maximum test case limit $N_{max}$ (112, 114). If M is less than or equal (<=) to $N_{max}$ ("YES" 114), test selection engine 60 notes the selected ones of test cases 26 for later aggregation into final test set 52 and determines whether all functions have been analyzed, e.g., whether the adaptive-combo algorithm is finished (108). If M is not less than or equal to $N_{max}$ ("NO" 114), test selection engine 60 decrements the "x" variable of the COMBO-SET algorithm by one, which in this instance sets x equal to $X_{max}-1$ and determines whether X is less than one (1) (116, 118).

If greater or equal to one ("NO" 118), test selection engine 60 executes the next iteration of the COMBO-SET(x) algorithm with the decremented value of x, determines and compares the selected number of test cases (M) to $N_{max}$, and either selects those test cases or once again decrements x and reiterates until x is less than 1 (110-118). If, however, x is less than one (1), test selection engine 60 in accordance with the adaptive-combo algorithm implements the MIN-SET algorithm to select test cases for function F (120).

Mathematically, the MIN-SET algorithm may be described as the following series of steps to solve the problem identified above within the above stated objective:

1. Initialize $T=\Phi$. Among N candidate test cases in $T_c$, select the single test case $t_1$ that has the maximum block coverage on all P blocks in $B_F$. If there are ties among test cases, select the one with the shortest average run time for test execution advantage. Include $t_1$ in the final test set $T=T+\{t_1\}$.
2. Among test cases in $T_c-T$, select the single test case $t_2$ that has the maximum block coverage over $B_F-B_1$. Include $t_2$ in the final test set $T=T+\{t_2\}$.
3. Among test cases in $T_c-T$, select the single test case $t_3$ that has the maximum block coverage over $B_F-(B_1 \cup B_2)$. Include $t_3$ in the final test set $T=T+\{t_3\}$.
4. Repeat the above process recursively, until $B_F-(B_1 \cup B_2 \cup \ldots \cup B_M)=\Phi$ or none of the blocks in $B_F-(B_1 \cup B_2 \cup \ldots \cup B_M)$ is covered by any test case in $T_c-T$. We end up with a solution of $T=\{t_1, t_2, \ldots, t_M\}$.

Notably, the MIN-SET test selection algorithm may resolve test case ties or, better stated, instances where two test cases cover the same blocks of the function by selecting the most efficient test case is selected, much like the COMBO-SET algorithm discussed above. Also, the MIN-SET test selection algorithm selects test cases that provide more coverage (i.e., more blocks exercised) over the designated function, and it makes no attempt to cover a block twice. Thus, the MIN-SET algorithm is the most precise one among all three test selection algorithms.

For example, suppose there are a total of three test cases that cover a designated function. The first test case $t_1$ covers blocks $b_1-b_2$, the second test case $t_2$ covers blocks $b_1-b_4$, and the third test case $t_3$ covers blocks $b_4-b_5$. The MIN-SET algorithm always starts from the test case that covers the most blocks. In this case, it is $t_2$, which exercises 4 blocks. Since MIN-SET never attempts to cover a block twice, $b_1-b_4$ is now considered covered. What's left is only $b_5$. Since t3 is the only test case that covers $b_5$, it will be selected as well. The final solution of the MIN-SET algorithm in this example is $t_2$ and $t_3$.

In this instance, test selection engine 60 does not determine the number of test cases 26 selected nor compare this number (M) to $N_{max}$, as this represents the smallest set of test cases 26 and therefore the most precise set of test cases 26, but likely the least safe. Regardless of how selected, test selection engine 60 determines whether all functions of list 62 have been analyzed, e.g., whether the adaptive-combo algorithm is "finished" (108). If not finished ("NO" 108), test selection engine 60 continues to select test cases for the next function in the manner described above (100-120).

If finished ("YES" 108), test selection engine 60 may, referring to FIG. 4C, aggregate those of test cases 26 selected for each function of changed and impacted function list 62 to form final test set 52 (122). Test selection engine 60 may then forward final test set 52 comprised of a subset of test cases 26 to regression harness 24, thereby transitioning the regression test from the test selection phase to the test implementation phase (124). Regression harness 24, as described above, may implement each of test cases 26 included within final test set 52 and generate report 66 indicating results 64 of executing each of these test cases 26 (126, 128). In some instances, also as described above, UI module 56 may present report 66 to user 50 via a user interface or in some instances at least indicate availability of a new report 66 (130). User 50 may utilize this report 66 to identify function errors or "bugs."

Figure 5:
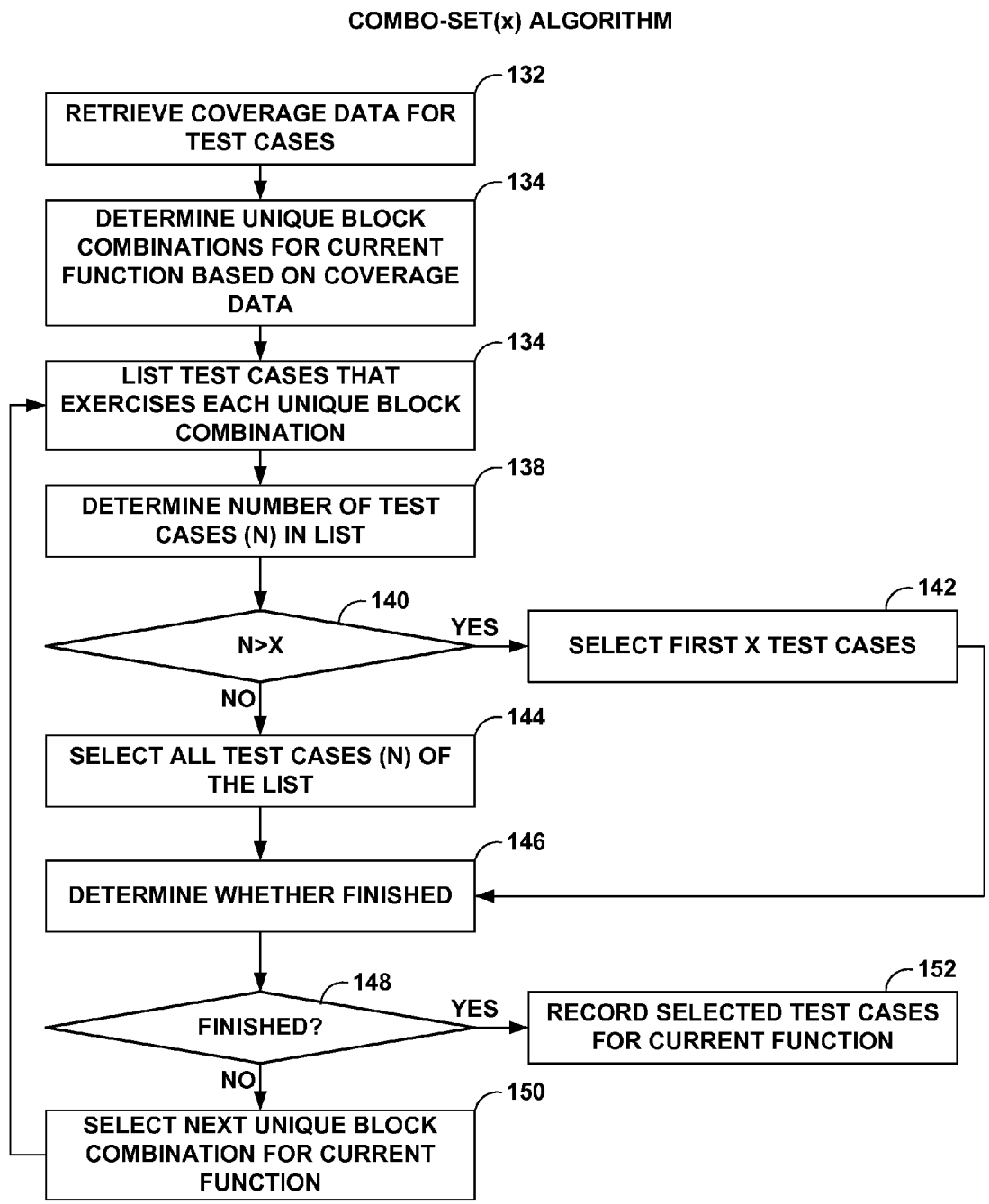
FIG. 5 is a flowchart illustrating exemplary operation of a computing device in performing test selection according to one of the test selection algorithms.

FIG. 5 is a flowchart illustrating exemplary operation of a computing device, such as regression server 12 of FIG. 2, in performing test selection according to the COMBO-SET(x) test selection algorithm. Intelligent RTS module 22 of regression server 12, generally, and test selection engine 60 of intelligent RTS module 22, more particularly, may perform the COMBO-SET(x) algorithm. While described herein with respect to regression test selection, any module or device may implement this COMBO-SET(x) algorithm to select a subset of test cases from a full set of test cases in order to balance two competing concerns, such as safety and precision.

Initially, test selection engine 60 may, when implementing the COMBO-SET(x) algorithm, retrieve coverage data 28 for test cases 26 (132). Coverage data 28 may, as described above, define function-level block combinations for each of test cases 26. Test selection engine 60 may then determine the unique block combinations for the currently selected one of the previously determined changed and impacted functions (134). For each unique block combination of the function, test selection engine 60 queues a list of test cases that exercises the function with this particular block combination, in the order of test case execution cost (time) from low to high (138).

Test selection engine 60 then, based on the given x in COMBO-SET(x), starts the test case selection procedure for every retrieved unique block combination. First, test selection engine 60 determines the number of test cases (n) in the list. Here, x sets an upper limit on the number of test cases that can be selected for every unique block combination. If there are more than x test cases queued in the list for one block combination, i.e., if n exceeds x, test selection engine 60 selects the first x test cases in the queue that have the shortest test case execution time ("YES" 140, 142). By selecting the first x test cases in the list, the COMBO-SET(x) algorithm ensures test selection engine 60 selects the most efficient, considering that the list is organized from most efficient test cases, e.g., test cases with the lowest execution cost or time, to least efficient test cases, e.g., test cases with the highest execution cost or time.

For example, assuming one of test cases 26, which may be referred to as "$t_1$," exercises blocks $b_1$, $b_2$ and $b_5$ of a function $F_1$, coverage data 28 for this test case may define a function-level block combination for test case $t_1$ on function $F_1$ as a block combination $\{b_1, b_2, b_5\}$. If another one of test cases 26, which may be referred to as "$t_2$," exercises blocks $b_2$, $b_5$ and $b_1$ for the same function $F_1$, coverage data 28 for this other test case may define a function-level block combination for test case $t_2$ on function $F_1$ as the same block combination $\{b_1, b_2, b_5\}$ even though test case $t_2$ traverses these blocks in a different order. In this example, test selection engine 60 may determine that both test case $t_1$ and $t_2$ should be queued for the block combination $\{b_1, b_2, b_5\}$.

If x equals one(x=1), which indicates only one test case can be selected for every unique block combination, test selection engine 60 may determine which of these two test cases $t_1$ and $t_2$ are more efficient, e.g., have a lower test execution cost by first listing these two test cases in order of efficiency. Test selection engine 60 may then determine the number of test cases in the list equal two (e.g., n=2) and compare n to x. As n is greater than or equal to x, test selection engine 60 may select only the first test case in the list, e.g., $t_1$.

In other words, coverage data 28 may express this cost as a time to execute each of test cases $t_1$ and $t_2$ and test selection engine 60 may access these times to create the list and order the test cases within what may be referred to as an "efficiency list." Test selection engine 60 may select the one of test cases $t_1$ and $t_2$ having the lower execution time by selecting the first test case of the list. For example, if $t_2$ is more efficient than $t_1$, test selection engine 60 may select test case $t_2$ form the "top" of the list. In this respect, test selection engine 60 may ensure "reasonable" precision by selecting the most efficient test case(s) from all those test cases that cover the function in the same way, e.g., covers the same unique block combination of the current function.

For COMBO-SET(x) algorithm, every unique block combination for the test function must select x test cases if available. Test selection module should not ignore any unique block combination retrieved from code coverage data 28. For example, assuming a third test case $t_3$ exercises blocks $b_1$, $b_2$, $b_5$ and $b_6$ of function $F_1$, coverage data 28 may define a function-level block combination for test case $t_3$ on $F_1$ as block combination $\{b_1, b_2, b_5, b_6\}$. Considering that this block combination covers an additional block $b_6$ of $F_1$, the function-level block combination for $t_3$ is unique from the block combination for $t_1$ and $t_2$. Thus, another x test cases, which may include $t_3$, should be selected for the new combination if available. If n does not exceed x, test selection engine 60 may select all test cases (n) indicated by the efficiency list ("NO" 140, 144).

After selecting the current unique block combination, test selection module may then determine whether it is finished evaluating all unique block combinations for the current function (146). If not finished ("NO" 148), test selection engine 60 may proceed to the next unique block combination identified for the particular function and continue to evaluate coverage data 28 in the manner described above (152, 132-150). If finished however ("YES" 148), test selection engine 60 may record the selected ones of test cases 26 that uniquely cover this particular function (152).

Test selection engine 60 may then evaluate the next function in the same manner as described above. That is, test selection engine 60 may first determine the total number of test cases selected for the current function (M) by adding up the number of test cases selected for each unique block. Next test selection engine 60 may compare this number M to $N_{max}$. If M exceeds $N_{max}$, test selection engine 60 may decrement x and proceed to reselect a subset of test cases 26 for each unique block combination. In some instances, test selection engine 60 may note each list of test cases generated for each determined unique block combination and merely reduce by one the number of selected test cases (e.g., as described above with respect to step 142) for those lists identifying a number of test cases equal to the previous x value. This in effect eliminates the least efficient one of the selected test cases from consideration for all those test cases selected from a list having a number of test cases greater than the recently decremented value of x. This optimization may greatly reduce computation cost and speed implementation of the COMBO-SET(x) algorithm for repeated iterations. Test selection engine 60 may proceed in this manner until the determined number of selected test cases per function (M) is less than or equal to $N_{max}$, as described above.

Notably, the COMBO-SET(x) algorithm may involve the "x" value that limits the number of test cases 26 test selection engine 60 selects for every unique block combination on the test function. Considering the above mathematical representation of the COMBO-SET(x) algorithm, the "x" value acts as a limit on the number of test cases 26 (as represented by $X_i$) test selection engine 60 selects for a unique block combination in a particular function F. A larger value of "x" generally results in more thorough coverage over the function, and hence, higher safety and worse precision.

Figure 6:
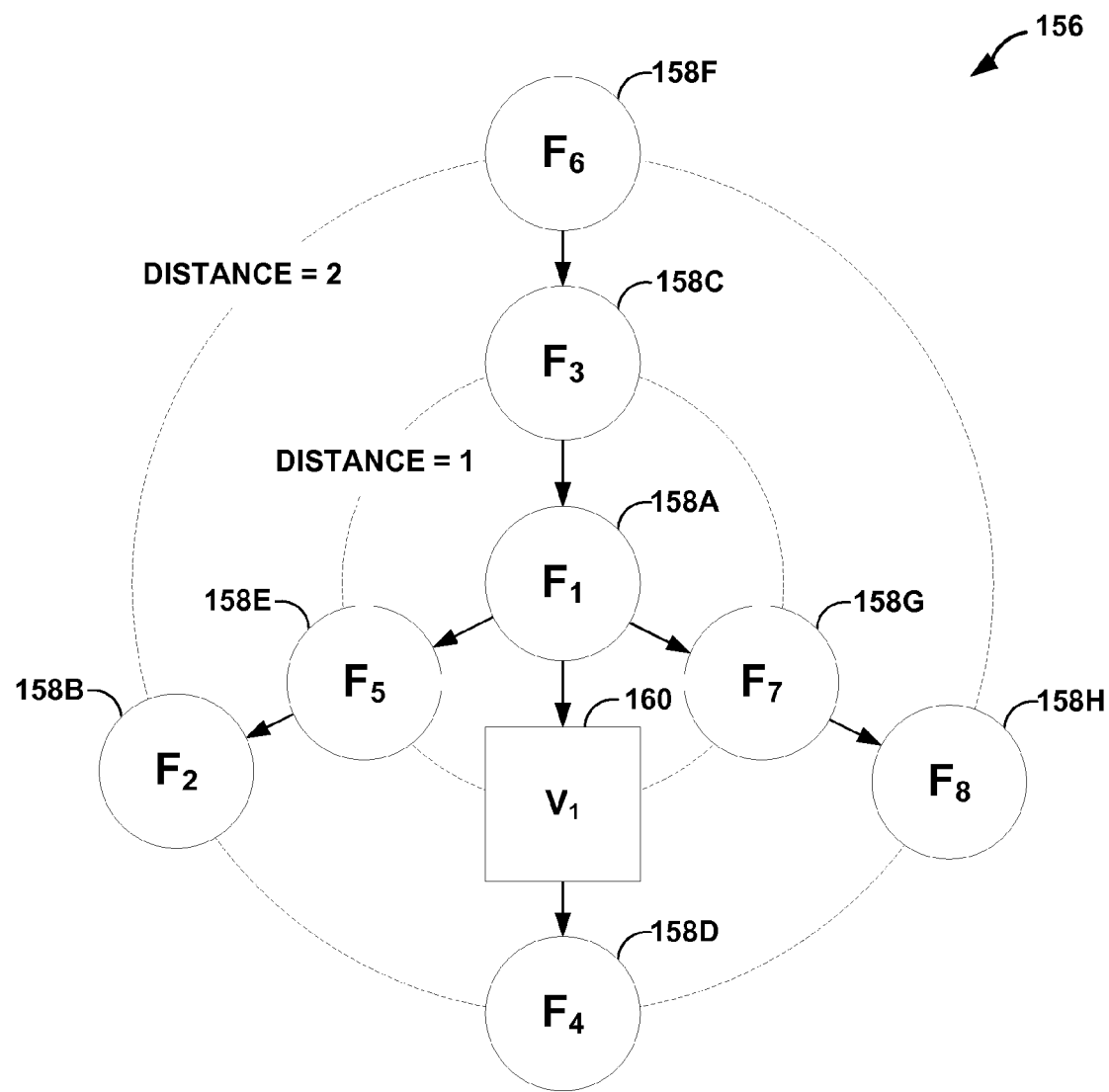
FIG. 6 is a block diagram illustrating an example graph data structure defined by dependency data determined in accordance with the techniques described herein.

FIG. 6 is a block diagram illustrating an example graph data structure 156 defined by dependency data, such as dependency data 30 shown in FIGS. 1 and 2, determined in accordance with the techniques described herein. As described above, dependency data 30 may define a graph, such as that represented by graph data structure 156 or simply "graph 156" for short, which intelligent RTS module 22 may utilize to determine impacted function based on previously determined changed functions and distance metric $D_{max}$.

As shown in FIG. 6, graph 156 may comprise a plurality of function nodes 158A-158H ("function nodes 158") labeled "$F_1$" through "$F_8$," respectively. Graph 156 also includes, as shown in the example of FIG. 6, a single global variable node 160. While shown as including a single global variable node 160, graph 156 may include one or more variable nodes similar to node 160. Moreover, graph 156 may include one or more function nodes and need not include a plurality or any other set number of either function nodes or variable nodes. The techniques therefore should not be limited to example graph 156 illustrated in FIG. 6.

As described above, two or more functions may be directly associated to one another, which is represented by one of function nodes 158 directly pointing to another one of function nodes 158. For example, function node 158A has an immediate or direct association with function nodes 158C, 158E and 158G. This direct association may result from a function call by the originating function to the other function. For example, the function F3 represented by function node 158C calls the function $F_1$ represented by function node 158A, while function $F_1$, as represented by function node 158A, calls both function $F_5$ represented by function node 158E and function $F_7$ represented by function node 158G. Thus, the unidirectional arrows, which represent pointers in terms of graph 156, may designate direct associations between functions.

To illustrate how impacted functions are determined in accordance with the techniques described herein, it is assumed for this purpose that function $F_1$ is changed between versions of source code 40. Considering the direct calling of function $F_1$ by function $F_3$, intelligent RTS module 22 may determine by accessing graph 156 that function $F_3$ is within the immediate impact scope of the change to function F1 with a "distance" equal to one, as denoted by dashed circle labeled "distance=1" in FIG. 6. Likewise, intelligent RTS module 22 may determine that functions $F_5$ and $F_7$ are also in function $F_1$'s immediate impact scope with distance equal to one, as these functions $F_5$ and $F_7$ are directly called by function $F_1$. Thus, if function $F_1$ is changed, intelligent RTS module 22 may determine that functions $F_3$, $F_5$ and $F_7$ are, although not changed, directly impacted by the change to function $F_1$, as the distance from function $F_1$ for each of these other function equals one.

As the distance between function decrease beyond one (1), intelligent RTS module 22 may determine indirect associations. As an example, intelligent RTS module 22 may determine that functions $F_6$, $F_2$ and $F_8$ are less directly related to function $F_1$ because these functions $F_6$, $F_2$ and $F_8$ are either called by a function that calls function $F_1$ or are called by a called function of function $F_1$. The distance for these functions $F_6$, $F_2$ and $F_8$ equals two as noted by the dashed circle labeled "distance=2" in FIG. 6. As distances increase, intelligent RTS module 22 may determine that those functions with higher distances are less impacted by a change to a particular function from which the distance is measured. In this respect, the distance metric can be used as a rough evaluation of an impact strength of the changed component toward other components.

As yet another example, graph 156 represents a function that writes to a global variable as a function node pointing or associated to a variable node. In the example of FIG. 6, this is shown by function node 158A pointing to or linked with global variable node 160. An indirect association may occur when one function writes to the global variable and another function different from the first reads the updated global variable. With respect to graph 156, this indirect association is shown by function node 158A writing to variable node 160, which is then read by function node 158D. Indirect associations typically have a distance greater than 1, which is also an even number.

In operation, each of nodes 158, 160 may comprise a data structure defining at least one pointer to another node, a backward pointer used for traversing the graph to a node that references the current node, a name or identifier, a type of node (e.g., function or variable) and other additional information that may facilitate analysis or traversal of graph 156. Intelligent RTS module 22 and, more particularly, impact analyzer 58 may traverse graph 156 to locate one of function nodes 158 listed as changed by code change data 32. Upon locating this node 158, intelligent RTS module 22 may traverse nodes 158, 160 within a given distance, $D_{max}$. Thus, assuming that function $F_1$ is identified as changed by code change data 32 and $D_{max}$ equals one, impact analyzer 58 traverses graph 156 to locate function node 158A and then traverses graph 156 within the dashed circle labeled "distance=1" to determine that functions $F_3$, $F_5$ and $F_7$ represent functions impacted by the change to function $F_1$.

In this respect, the distance metric provides a precision control over the test selection results. Without this distance metric for precision control, intelligent RTS module 22 may overly favor safety, resulting in a test set that is too large to provide any meaningful cost savings. This distance metric $D_{max}$ may therefore focus intelligent RTS module 22 on those functions most likely to be impacted by changes and thereby increase the precision of the resulting final test set.

Figure 7A:
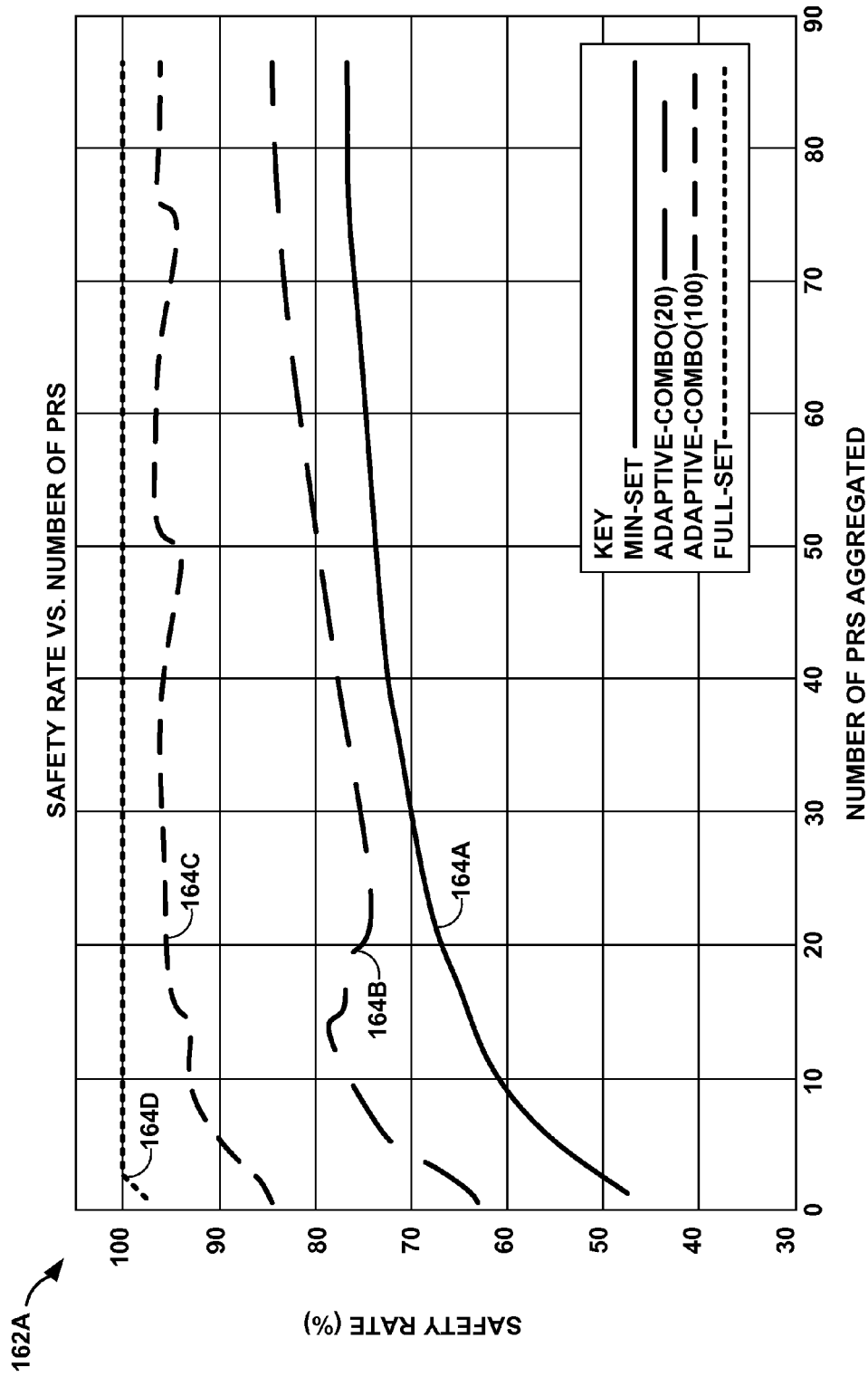
FIGS. 7A, 7B are diagrams illustrating exemplary graphs depicting respective safety and precision metrics of various test selection algorithms including various adaptive-combo test selection algorithms implemented in accordance with the techniques described herein.
Figure 7B:
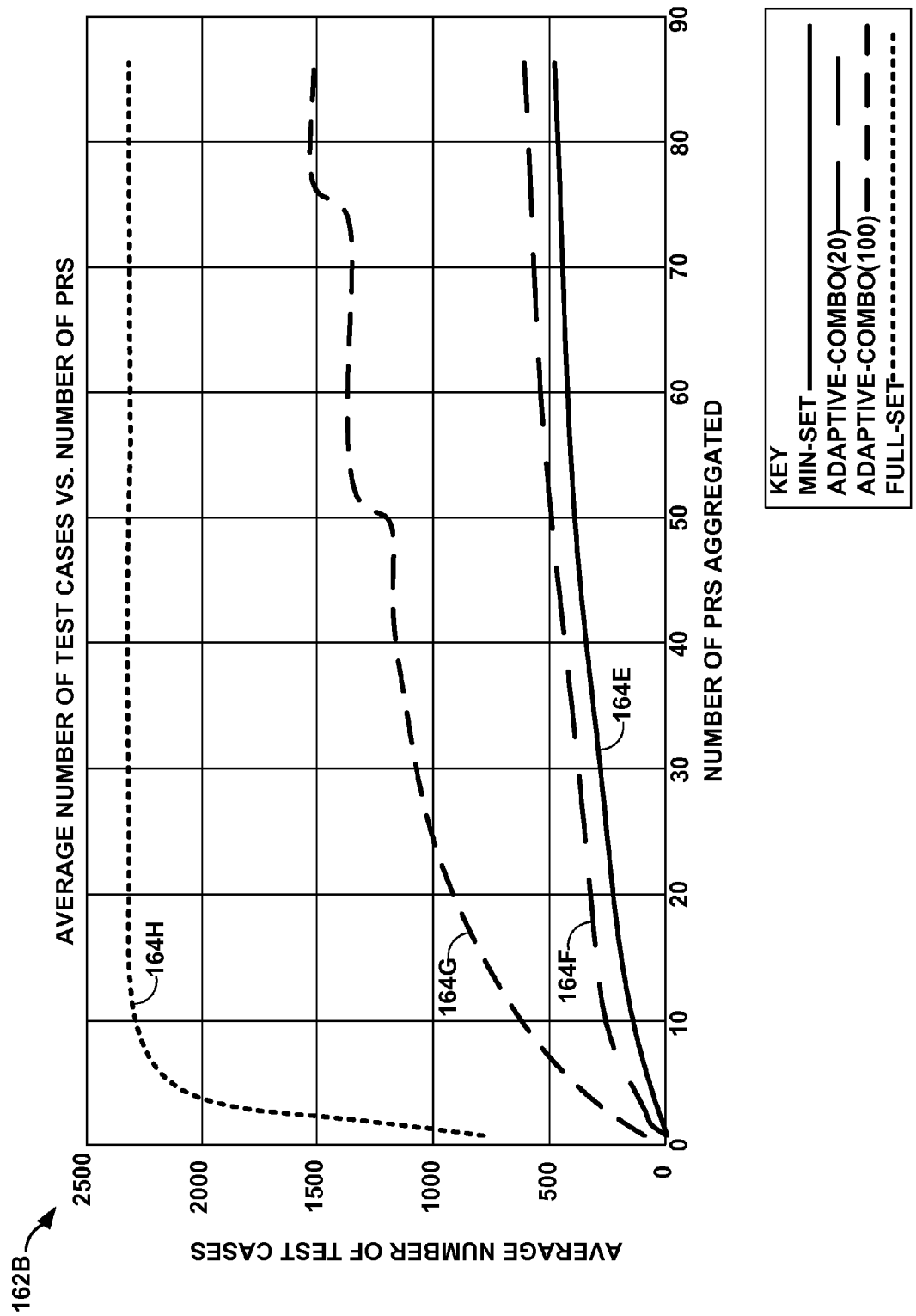

FIGS. 7A, 7B are diagrams illustrating exemplary graphs 162A, 162B depicting respective safety and precision metrics of various test selection algorithms including various adaptive-combo test selection algorithms implemented in accordance with the techniques described herein. A user, such as user 50 of FIG. 2, may utilize these graphs 162A, 162B ("graphs 162") to calibrate the various inputs, e.g., $N_{max}$, $X_{max}$, and $D_{max}$, and define profiles, such as profiles 68, that achieve a desired level of safety, as described above. Moreover, these graphs 162 illustrate how the adaptive-combo algorithm achieves a careful balance between safety and precision over other algorithms.

As shown in FIG. 7A, graph 162A depicts a safety rate in terms of percentage versus (vs.) a number of problem reports (PRs). The safety rate is presented along the y-axis of graph 162A while the aggregate number of PRs is presented along the x-axis of graph 162A. Defined within graph 162A are lines 164A-164D, where line 164A represents the safety over aggregate number of PRs for an implementation of just the above described MIN-SET algorithm, line 164B represents the safety over PRs for an implementation of the above described adaptive-combo algorithm with $N_{max}$ (the maximum number of test cases allowed to be selected for each function) set to 20, line 164C represents the safety over PRs for an implementation of the above described adaptive-combo algorithm with $N_{max}$ set to 100, and line 164D represents the safety over PRs for an implementation of just the above described FULL-SET algorithm. Notably, for both implementations of the adaptive-combo algorithm, the maximum number of test cases for every unique block combination of a function $X_{max}$ is set to 40, such that the adaptive combo algorithm searches through the following sequence of algorithms: FULL-SET, COMBO-SET(40), . . . , COMBO-SET(1), MINSET. Also, the maximum distance metric $D_{max}$ is set to one (1), such that only direct calling and called functions of changed functions are considered impacted.

With respect to graph 162A, the safety rate is defined to be the average percentage ration of the number of PRs that each algorithm successfully selects at least one fault-revealing test case divided by the total number of PRs, which in this instance is equal to 87. It should be noted that lines 164A-164D generally grow as more PRs are aggregated. This is because test cases selected for one PR individually might be able to reveal another PR, although test selection 60 may fail to locate the fault revealing test case individually for the second PR. Thus, when the two PRs are aggregated together, the selected test set can reveal both PRs, resulting in an enhanced safety rate than the individual case. In other words, by aggregating the PRs, the fault-revealing test cases missed out by the test selection algorithm for on PR might be picked up by the test selection algorithm output for another PR, thereby improving the total safety rate. As a result, each of lines 164 show a general growing trend when the number of aggregated PRs increases.

Referring to FIG. 7B, graph 162B depicts the average number of test cases (selected) versus (vs.) the number of PRs. The y-axis of graph 162B represents the average number of test cases (selected) while the x-axis, similar to graph 162A, represents the aggregate number of PRs. Lines 164E-164H represent the performance of implementations of the same algorithms as respective lines 164A-164D.

These graphs 162 may be generated in accordance with the following methodology, which relies on actual or known faults identified by PRs rather than manually constructed faults that may fail to truthfully mirror the variety of fault types that occur in reality:
1. Query a PR database to obtain a list of real-life PRs (Problem Reports) found by regression test cases in a designated past or previous software release.
2. For each of these PRs, query a test history database to obtain a full list of regression test cases that are associated with this PR. These test cases form the Reality Test Set. Note that the Reality Test Set is on a per-PR basis.
3. For each of these PRs, query a CVS database and the static analysis database to obtain the changed & impacted functions in the PR fix. Then apply the RTS test selection algorithm for each of these functions. The union of these selected test cases forms the RTS Test Set. Note that the RTS Test Set can be on a per-PR basis, or on a per-multi-PR basis, depending on the evaluation granularity.
4. For each PR, search for Reality test cases in the RTS Test Set. If there is at least one Reality test case in the RTS Test Set, it means that the RTS algorithm is capable of revealing the fault. Otherwise, the RTS algorithm fails in revealing the fault. Note that containing more than one Reality test cases in the RTS Test Set does not improve the fault-revealing capability of the RTS algorithm.

Referring again to graph 162A of FIG. 7A, when the number of aggregated PRs is above 5, the safety rate of adaptive-combo algorithm with $N_{max}$ equal to 100, as represented by line 164C, stays above 90% and approaches 97% when the PR number is close to 90, displaying strong safety performance using only a fraction of the full regression suite. For example, for 20 PRs, the adaptive-combo algorithm with $N_{max}$ set to 100, as represented by line 164C, accomplishes 95.9% safety using 840 test cases, referring to corresponding line 164G shown in graph 162B of FIG. 7B. When compared to the "retest-all" regression test as represented by the FULL-SET line 164D, the adaptive-combo algorithm may utilize only 35.3% of the test cases of a full regression test. This may amount to a significant 64.7% test execution savings at the expense of only a 4.1% safety compromise. Even for 80 PRs, this implementation of the adaptive-combo algorithm may still manage to achieve 36.8% test execution saving with only a 3.5% safety compromise.

Relaxing the desired level of safety further from approximately 90% to 80%, such as might be desired for minor releases, user 50 may configure adaptive-combo algorithm with a $N_{max}$ set to 20, which can further increase the precision. This implementation is represented by line 164B in graph 162A of FIG. 7A. For 80 PRs, as an example, this more precise implementation of the adaptive-combo algorithm selects only 587 test cases (as garnered from line 164F of graph 162B depicted in FIG. 7B), which is 24.7% of the full regression test suite. Yet, this implementation reaches a fairly good safety rate of 84.8% (as determined from line 164B of graph 162A). For only 20 PRs, this implementation selects even fewer test cases, e.g., only 292, and it manages to achieve a safety rate of 76.8%, which may be desired for service or internal releases.

Generally, an analysis of graphs 162 suggests that the MIN-SET algorithm has the worst safety of those algorithms tested but the best precision. The FULL-SET algorithm, while having the best safety, suffers from the worst precision. Neither one of these algorithms may provide a proper balance between safety and precision nor may these MIN-SET and FULL-SET algorithms facilitate any control over the test selection operations. However, the adaptive-combo algorithm which adaptively utilizes generic algorithms including FULL-SET, COMBO-SET(40), . . . , COMBO-SET(1), and MIN-SET, may by way of its various controls, e.g., $D_{max}$, $N_{max}$, and $X_{max}$, facilitate the tailoring of test selection to achieve a desired level of safety while not drastically impacting precision. In this respect, the techniques may not only balance safety and precision but also remain flexible such that RTS may be tailored to suite the needs of particular portions of the test development cycle.

Overall, the techniques described herein may select test cases based on block coverage of a test case exercising a source function. These techniques may define an adaptive-combo algorithm that represents a hybrid of several generic test selection algorithms, one of which (i.e., the COMBO-SET algorithm) may facilitate the above described flexibility. Moreover, the techniques, also as described above, may strive to maximize the test selection safety without violating an easily configurable precision constraint (e.g., $N_{max}$). By adjusting this precision "knob" or $N_{max}$, the technique may be implemented in a variety of application scenarios concerned with regression testing. The techniques, while capable of selecting tests for small software programs with small code bases, may particularly facilitate test selection for large software programs having a large code base to select test cases whose coverage considerably overlaps.

Figure 8A:
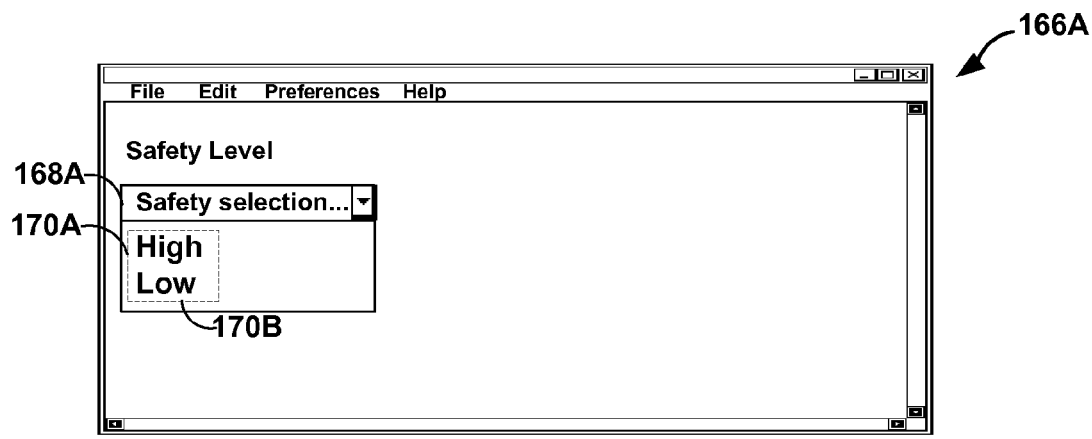
FIGS. 8A-8B are diagrams illustrating exemplary user interfaces with which a user interacts to select a safety level in accordance with the techniques described above.
Figure 8B:
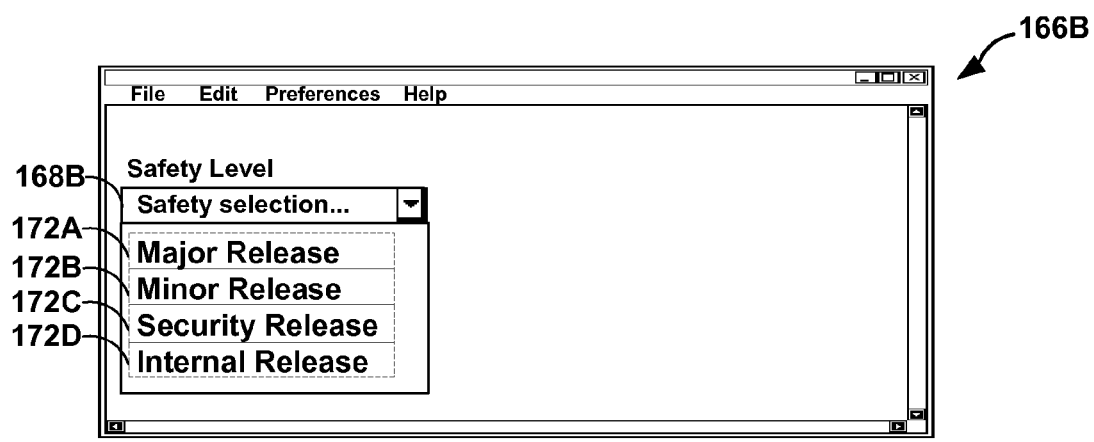

FIGS. 8A-8B are diagrams illustrating exemplary user interfaces 166A, 166B respectively with which a user interacts to select a safety level in accordance with the techniques described above. User interface module 56 of FIG. 2 may present either one or both of user interfaces 166A, 166B ("user interfaces 166") to a user, such as user 50. While shown as Graphical User Interfaces (GUIs), user interfaces 166 may alternatively each comprise Command Line Interfaces (CLIs) with which a user may interact to designate a given level of safety by entering input or data defining commands.

As shown in FIG. 8A, user interface 166A includes a drop down input box 168A that defines a plurality of handles 170A, 170B. While described herein with respect to a particular type of input, e.g., drop down input box 168A, user interface 166A may include any type of input, such as radio inputs, slider inputs, text box inputs, or the like, by which user 50 may select or specify one of the plurality of handles. User 50 may, in the example of drop down input box 168A, select either one of handles 170A, 170B ("handles 170"). Handle 170A comprises a handle denoted as "high" and corresponds to a high level of safety, while handle 170B comprises a handle denoted as "low" and corresponds to a low level of safety. User 50 may select either of these handles 170 depending on the particular type of release undergoing regression testing, as described above.

As shown in FIG. 8B, user interface 166B also includes a drop down input box 168B that defines an alternative plurality of handles 172A-172D. While described herein with respect to a particular type of input, e.g., drop down input box 168B, user interface 166B may include any type of input, such as radio inputs, slider inputs, text box inputs, or the like, by which user 50 may select or specify one of the plurality of handles. User 50 may, in the example of drop down input box 168B, select one of handles 172A-172D ("handles 172"). Handle 172A comprises a handle denoted as "major release" and corresponds to a level of safety the corporate policy requires testing to ensure for a major software release. Handle 172B comprises a handle denoted as "minor release" and corresponds to a level of safety the corporate policy requires testing to ensure for a minor software release. Handle 172C comprises a handle denoted as "security release" and corresponds to a level of safety the corporate policy requires testing to ensure for a security software release. Handle 172D comprises a handle denoted as "internal release" and corresponds to a level of safety the corporate policy requires testing to ensure for an internal software release. User 50 may select one of these handles 17s depending on the particular type of release undergoing regression testing, as described above.

Various embodiments of the invention have been described. These and other embodiments are within the scope of the following claims.

The invention claimed is:

1. A method comprising: determining, with a computing device, those functions of source code whose lines of code have changed between different versions of the software program;
   determining, with the computing device, those of the functions of the source code whose lines of code have not changed but have been impacted by the changes based on dependency data and the determined changed functions, wherein the dependency data defines dependencies between the functions of the source code;
   selecting, with the computing device, one or more test cases from a full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a number of test cases less than a maximum test case limit;
   aggregating, with the computing device, the one or more test cases selected for each one of the changed and impacted functions to generate a final test set that includes a subset of test cases from the full set of test cases; and
   executing, with the computing device, the final test set to ensure a given level of safety with respect to a percentage of functional errors that reside within a software program compiled from the source code, wherein the given level of safety requires the computing device to select the subset of test cases from the full set of test cases such that execution of the subset of test cases reveals at least the percentage of functional errors.

2. The method of claim 1, wherein selecting one or more test cases comprises selecting, based on coverage data, a subset of test cases from the full set of test cases in accordance with one of the test selection algorithms that selects the subset of test cases such that each test case of the subset uniquely exercises a current one of the changed and impacted functions.

3. The method of claim 2,
   wherein the coverage data defines at least one function-level block combination for each test case of the full set of test cases,
   wherein each of the function-level block combinations comprises data that associates a different one of the test cases with one or more blocks of a particular one of the functions of the source code,
   wherein each of the blocks comprises a contiguous block of the source code having a single point of entry and a single point of exit, and
   wherein selecting, based on the coverage data, the subset comprises:
   determining, based on the coverage data, each of the function-level block combinations that is a unique block combination for the current function; and
   selecting, for each of the unique block combination, one or more test cases that exercises the unique block combination.

4. The method of claim 3, wherein selecting the test case comprises:
   listing the selected test cases in order of decreasing efficiency;
   determining a number of test cases in the list;
   comparing the number of test cases in the list to a maximum number of test cases allowed for each of the unique block combinations; and
   selecting the maximum number of test cases allowed for each of the unique block combinations from the list such that the only the most efficient of the selected test cases of the list are selected.

5. The method of claim 4, wherein selecting, based on the coverage data, the subset further comprises:
   determining a number of test cases included within the subset by adding together each of the one or more test cases that exercises each one of the unique block combinations of the current function;
   determining whether the number of tests is greater than or equal to a maximum test case limit for functions;
   decrementing the maximum number of test cases allowed for each of the unique block combinations upon determining the number of tests is greater than the maximum test case limit for functions; and
   reiterating the selection using the decremented maximum number of test cases allowed for each of the unique block combinations.

6. The method of claim 1, wherein determining, with the computing device, those of the functions of the source code whose lines of code have not changed but have been impacted by the changes comprises:
   accessing a graph data structure defined by the dependency data, wherein the graph data structure includes a plurality of nodes, and wherein each of the plurality of nodes represents either one of the functions or a variable of the source code;
   traversing the nodes of the graph data structure to determine which of the nodes represents one of the determined changed functions;

traversing the nodes of the graph data structure to one or more impacted nodes that lie a set distance from the one of the nodes determined to represent the one of the changed functions; and determining, based on which of the functions the impacted nodes represent, those of the functions of the source code whose lines of code have not changed but have been impacted by the change.

7. The method of claim 1, wherein selecting one or more test cases comprises selecting, based on coverage data, the subset of test cases from the full set of test cases in accordance with one of the test selection algorithms that selects the subset of test cases such that each test case of the subset exercises a current one of the changed and impacted functions.

8. The method of claim 7, wherein the coverage data defines at least one function-level block combination for each test case of the full set of test cases, wherein each of the function-level block combinations comprises data that associates a different one of the test cases with one or more blocks of a particular one of the functions of the source code, wherein each of the blocks comprises a contiguous block of the source code having a single point of entry and a single point of exit, and wherein selecting, based on the coverage data, the subset comprises:

determining whether one of the function-level block combinations exercises at least one block of the current function; and selecting the test case in response to a determination that the one of the block combinations exercises at least one block of the current function.

9. The method of claim 1, wherein selecting one or more test cases comprises selecting, based on coverage data, the subset of test cases from the full set of test cases in accordance with one of the test selection algorithms that selects the subset of test cases such that the subset of test cases exercises the current function with little overlap.

10. The method of claim 9, wherein the coverage data defines at least one function-level block combination for each test case of the full set of test cases, wherein each of the function-level block combinations comprises data that associates a different one of the test cases with one or more blocks of a particular one of the functions of the source code, wherein each of the blocks comprises a contiguous block of the source code having a single point of entry and a single point of exit, and wherein selecting, based on the coverage data, the subset comprises:

determining whether one of the function-level block combinations associated with a test case of the subset represents a maximum block combination that provides a maximum coverage over blocks associated with the current function; and selecting the test case in response to a determination that the one of the block combinations associated with the test case represents the maximum block combination.

11. The method of claim 1, further comprising:

presenting a user interface that displays a plurality of safety levels; and receiving a selection from a user via the user interface that indicates one of the plurality of safety levels as the given level of safety.

12. The method of claim 11, wherein presenting the user interface comprises presenting a user interface that displays a plurality of handles, wherein each handle corresponds to a different one of the plurality of safety levels, and wherein the plurality of handles include a handle indicated a major release, a handle indicating a minor release, a handle indicating a security release, and a handle indicating an internal release, wherein receiving the selection comprises receiving the selection from the user via the user interface that indicates one of the plurality of handles, and the method further comprising selecting one of the plurality of safety levels that corresponds to the indicated one of the plurality of handles as the given level of safety.

13. The method of claim 1, further comprising:

configuring the test selection algorithms and the maximum test case limit to tailor a precision and safety when selecting the final test set, wherein executing the final test set comprises executing the final test set to detect a set of functional errors within a previous version of the software program compiled from a previous version of the source code, comparing the detected set of functional errors to a known set of functional errors detected by way of previous execution of the full test set;

determining a level of safety based on the comparison of the set of functional errors and the known set of functional errors;

comparing the level of safety to the given level of safety; and re-configuring the test selection algorithms and the maximum test case limit based on the comparison between the level of safety and the given level of safety so as to select the final test set such that the final test set ensures the given level of safety.

14. The method of claim 1, wherein the computing device comprises a regression server.

15. A method comprising:

determining, with a computing device, those functions of source code whose lines of code have changed between different versions of the software program;

determining, with the computing device, those of the functions of the source code whose lines of code have not changed but have been impacted by the changes based on dependency data and the determined changed functions, wherein the dependency data defines dependencies between the functions of the source code;

selecting, with the computing device, a subset of a full set of test cases that uniquely exercises every one of the changed and impacted functions based on coverage data, wherein the coverage data defines at least one function-level block combination for each test case of the full set of test cases, wherein each of the function-level block combinations comprises data that associates a different one of the test cases with one or more blocks of a particular one of the functions of the source code, wherein each of the blocks comprises a contiguous block of the source code having a single point of entry and a single point of exit; and executing, with the computing device, the subset of the full set of test cases to ensure a given level of safety with respect to a percentage of functional errors that reside within a software program compiled from the source code, wherein the given level of safety requires the computing device to select the subset of test cases from the full set of test cases such that execution of the subset of test cases reveals at least the percentage of functional errors.

16. The method of claim 15, wherein selecting, based on the coverage data, the subset comprises:
- determining, based on the coverage data, each of the function-level block combinations that is a unique block combination for the current function; and
- selecting, for each of the unique block combination, one or more test cases that exercises the unique block combination.

17. The method of claim 16, wherein selecting the test case comprises:
- listing the selected test cases in order of decreasing efficiency;
- determining a number of test cases in the list;
- comparing the number of test cases in the list to a maximum number of test cases allowed for each of the unique block combinations; and
- selecting the maximum number of test cases allowed for each of the unique block combinations from the list such that the only the most efficient of the selected test cases of the list are selected.

18. The method of claim 17, wherein selecting, based on the coverage data, the subset further comprises:
- determining a number of test cases included within the subset by adding together each of the one or more test cases that exercises each one of the unique block combinations of the current function;
- determining whether the number of tests is greater than or equal to a maximum test case limit for functions;
- decrementing the maximum number of test cases allowed for each of the unique block combinations upon determining the number of tests is greater than the maximum test case limit for functions; and
- reiterating the selection of the subset of the full set of test cases using the decremented maximum number of test cases allowed for each of the unique block combinations.

19. A testing server comprising: a control unit that includes one or more processors that execute an intelligent test selection module that determines those functions of source code whose lines of code have changed between different versions of the software program, determines those of the functions of the source code whose lines of code have not changed but have been impacted by the changes based on dependency data and the determined changed functions, wherein the dependency data defines dependencies between the functions of the source code, selects one or more test cases from a full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a number of test cases less than a maximum test case limit and aggregates the one or more test cases selected for each one of the changed and impacted functions to generate a final test set that includes a subset of test cases from the full set of test cases,
- wherein the one or more processors also execute a regression harness that executes the final test set to ensure a given level of safety with respect to a percentage of functional errors that reside within a software program compiled from the source code, wherein the given level of safety requires the computing device to select the subset of test cases from the full set of test cases such that execution of the subset of test cases reveals at least the percentage of functional errors.

20. The testing server of claim 19, wherein the intelligent test selection module includes an a test selection engine that selects, based on the coverage data, a subset of test cases from the full set of test cases in accordance with one of the test selection algorithms that selects the subset of test cases such that each test case of the subset uniquely exercises a current one of the changed and impacted functions.

21. The testing server of claim 20, wherein the coverage data defines at least one function-level block combination for each test case of the full set of test cases, wherein each of the function-level block combinations comprises data that associates a different one of the test cases with one or more blocks of a particular one of the functions of the source code, wherein each of the blocks comprises a contiguous block of the source code having a single point of entry and a single point of exit, and
- wherein the test selection engine further determines, based on the coverage data, each of the function-level block combinations that is a unique block combination for the current function and selects, for each of the unique block combination, one or more test cases that exercises the unique block combination.

22. The testing server of claim 21, wherein the test selection engine further lists the selected test cases in order of decreasing efficiency, determines a number of test cases in the list, compares the number of test cases in the list to a maximum number of test cases allowed for each of the unique block combinations and selects the maximum number of test cases allowed for each of the unique block combinations from the list such that the only the most efficient of the selected test cases of the list are selected.

23. The testing server of claim 22, wherein the test selection engine further determines a number of test cases included within the subset by adding together each of the one or more test cases that exercises each one of the unique block combinations of the current function, determines whether the number of tests is greater than or equal to a maximum test case limit for functions, decrements the maximum number of test cases allowed for each of the unique block combinations upon determining the number of tests is greater than the maximum test case limit for functions, and reiterates the selection using the decremented maximum number of test cases allowed for each of the unique block combinations.

24. The testing server of claim 19, wherein the intelligent test selection module includes an impact analyzer that accesses a graph data structure defined by the dependency data, wherein the graph data structure includes a plurality of nodes, and wherein each of the plurality of nodes represents either one of the functions or a variable of the source code, traverses the nodes of the graph data structure to determine which of the nodes represents one of the determined changed functions, traverses the nodes of the graph data structure to one or more impacted nodes that lie a set distance from the one of the nodes determined to represent the one of the changed functions, and determines, based on which of the functions the impacted nodes represent, those of the functions of the source code whose lines of code have not changed but have been impacted by the change.

25. The testing server of claim 19, wherein the intelligent test selection module includes a test selection engine that selects, based on coverage data, the subset of test cases from the full set of test cases in accordance with one of the test selection algorithms that selects the subset of test cases such that each test case of the subset exercises a current one of the changed and impacted functions.

26. The testing server of claim 25,
wherein the coverage data defines at least one function-level block combination for each test case of the full set of test cases,
wherein each of the function-level block combinations comprises data that associates a different one of the test cases with one or more blocks of a particular one of the functions of the source code,
wherein each of the blocks comprises a contiguous block of the source code having a single point of entry and a single point of exit, and
wherein the test selection engine further determines whether one of the function-level block combinations exercises at least one block of the current function, and selects the test case in response to a determination that the one of the block combinations exercises at least one block of the current function.

27. The testing server of claim 19, wherein the intelligent test selection module includes a test selection engine that selects, based on coverage data, the subset of test cases from the full set of test cases in accordance with one of the test selection algorithms that selects the subset of test cases such that the subset of test cases exercises the current function with little overlap.

28. The testing server of claim 27,
wherein the coverage data defines at least one function-level block combination for each test case of the full set of test cases,
wherein each of the function-level block combinations comprises data that associates a different one of the test cases with one or more blocks of a particular one of the functions of the source code,
wherein each of the blocks comprises a contiguous block of the source code having a single point of entry and a single point of exit, and
wherein the test selection engine further determines whether one of the function-level block combinations associated with a test case of the subset represents a maximum block combination that provides a maximum coverage over blocks associated with the current function, and selects the test case in response to a determination that the one of the block combinations associated with the test case represents the maximum block combination.

29. The testing server of claim 19, wherein the one or more processors also execute a user interface module that presents a user interface to i) display a plurality of safety levels and ii) receive a selection from a user via the user interface that indicates one of the plurality of safety levels as the given level of safety.

30. The testing server of claim 29, wherein the user interface further presents the user interface to i) display a plurality of pre-defined handles, wherein each of the handles corresponds to a different one of the plurality of safety levels, and wherein the plurality of handles include a first handle indicating a major software release, a second handle indicating a minor software release, a third handle indicating a security software release, and a fourth handle indicating an internal software release, and ii) receive the selection from the user via the user interface that indicates one of the plurality of handles, and
wherein the control unit stores data defining a corporate policy specifying one of the plurality of levels of safety for each of the major, minor, security and internal software releases and selects the corresponding one of the plurality of levels of safety as the given level of safety based on the selection indicating one of the plurality of handles.

31. The testing server of claim 19,
wherein the control unit includes a user interface module that presents a user interface with which a user may interact to configure the test selection algorithms and the maximum test case limit to tailor a precision and safety with which the final test set is selected,
wherein the regression harness further executes the final test set to detect a set of functional errors within a previous version of the software program compiled from a previous version of the source code,
wherein the control unit further compares the detected set of functional errors to a known set of functional errors detected by way of previous execution of the full test set, and determines a level of safety based on the comparison of the set of functional errors and the known set of functional errors,
wherein the user interface module presents via the user interface presents the level of safety, and
wherein the user interface module presents the user interface to enable the user to re-configure the test selection algorithms and the maximum test case limit based on a comparison between the presented level of safety and the given level of safety so as to select the final test set such that the final test set ensures the given level of safety.

32. A testing system comprising:
a test bench comprising a plurality of network devices;
a test selection database that stores dependency data and code change data;
a test case database that stores a full set of test cases;
a testing server communicatively coupled to the test bench, the test selection database and the test case database, wherein the testing server includes:
a control unit that comprises one or more processors that execute an intelligent test selection module that determines those functions of source code whose lines of code have changed between different versions of the software program based on the code change data, determines those of the functions of the source code whose lines of code have not changed but have been impacted by the changes based on the dependency data and the determined changed functions, wherein the dependency data defines dependencies between the functions of the source code, selects one or more test cases from the full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a number of test cases less than a maximum test case limit and aggregates the one or more test cases selected for each one of the changed and impacted functions to generate a final test set that includes a subset of test cases from the full set of test cases, and
wherein the one or more processors also execute a regression harness that executes the final test set within the plurality of network devices of the test bench to ensure a given level of safety with respect to a percentage of functional errors that reside within a software program compiled from the source code, wherein the given level of safety requires the computing device to select the subset of test cases from the full set of test cases such that execution of the subset of test cases reveals at least the percentage of functional errors.

33. A non-transitory computer-readable medium comprising instructions for causing a programmable processor to:
- determine, with a computing device, those functions of source code whose lines of code have changed between different versions of the software program;
- determine, with the computing device, those of the functions of the source code whose lines of code have not changed but have been impacted by the changes based on dependency data and the determined changed functions, wherein the dependency data defines dependencies between the functions of the source code;
- select, with the computing device, one or more test cases from a full set of test cases for each one of the changed and impacted functions in accordance with an adaptive test selection algorithm, wherein the adaptive test selection algorithm adaptively applies one or more test selection algorithms in order of decreasing safety assurances and increasing precision provided by each of the test selection algorithms until one of the test selection algorithms returns a number of test cases less than a maximum test case limit;
- aggregate, with the computing device, the one or more test cases selected for each one of the changed and impacted functions to generate a final test set that includes a subset of test cases from the full set of test cases; and
- execute, with the computing device, the final test set to ensure a given level of safety with respect to a percentage of functional errors that reside within a software program compiled from the source code, wherein the given level of safety requires the computing device to select the subset of test cases from the full set of test cases such that execution of the subset of test cases reveals at least the percentage of functional errors.

\* \* \* \* \*